US012205068B2

(12) United States Patent
Kumar et al.

(10) Patent No.: US 12,205,068 B2
(45) Date of Patent: Jan. 21, 2025

(54) CATCHMENT MODELING

(71) Applicant: Walmart Apollo, LLC, Bentonville, AR (US)

(72) Inventors: Sindiri Sai Kumar, Bengaluru (IN); Ravikumar Batchu, Bengaluru (IN); Tanvi Gupta, Bengaluru (IN); Rishi Saraf, Bengaluru (IN); Manful Ram, Bengaluru (IN)

(73) Assignee: Walmart Apollo, LLC, Bentonville, AR (US)

( * ) Notice: Subject to any disclaimer, the term of this patent is extended or adjusted under 35 U.S.C. 154(b) by 683 days.

(21) Appl. No.: 17/231,590

(22) Filed: Apr. 15, 2021

(65) Prior Publication Data

US 2022/0335380 A1    Oct. 20, 2022

(51) Int. Cl.
*H04W 4/21* (2018.01)
*G06Q 10/0835* (2023.01)
*H04W 4/021* (2018.01)
*H04W 4/024* (2018.01)
*H04W 4/18* (2009.01)
*G06Q 10/0836* (2023.01)

(52) U.S. Cl.
CPC ...... *G06Q 10/08355* (2013.01); *H04W 4/021* (2013.01); *H04W 4/024* (2018.02); *H04W 4/185* (2013.01); *G06Q 10/0836* (2013.01)

(58) Field of Classification Search
CPC ........ G06Q 10/08355; G06Q 10/0836; H04W 4/021; H04W 4/024; H04W 4/185
See application file for complete search history.

(56) References Cited

U.S. PATENT DOCUMENTS

| 9,465,811 B2 | 10/2016 | Basovnik et al. |
| 10,317,219 B1 | 6/2019 | Borgerson et al. |
| 10,432,311 B1 * | 10/2019 | Poon ...................... H04B 10/27 |

(Continued)

OTHER PUBLICATIONS

Hwang, Richard et al., "How we Designed Road Distances in DoorDash Search", https://medium.com/@DoorDash/how-we-designed-road-distances-in-doordash-search-913ef8434099, Sep. 23, 2017, 6 pages.

(Continued)

*Primary Examiner* — Keith D Bloomquist
(74) *Attorney, Agent, or Firm* — Foley IP Law, PLLC

(57) ABSTRACT

Examples provide catchment modeling for identifying destination locations eligible for last mile delivery from source locations, such as a store or fulfillment center. The catchment modeling system divides a catchment area associated with the source location into a plurality of geohash blocks within a polygon fence. The size of the geohash blocks varies relative to proximity of each geohash block to a fence point within a polygon fence. The plurality of blocks includes a set of inclusion blocks within the predetermined distance from the source location and/or a set of exclusion blocks exceeding the predetermined distance from the source location. Data compression via polygon merging is performed. The compressed data is cached for utilization during catchment delivery eligibility determinations. If a destination address is within the set of inclusion address or absent from the set of exclusion addresses, the destination is eligible for delivery from the source to the destination.

18 Claims, 15 Drawing Sheets

(56) References Cited

U.S. PATENT DOCUMENTS

| | | | |
|---|---|---|---|
| 10,638,264 B1 | 4/2020 | Pao et al. | |
| 10,810,235 B1* | 10/2020 | Bakshi | G06F 16/9537 |
| 2002/0007321 A1* | 1/2002 | Burton | G06Q 30/0603 |
| | | | 705/26.61 |
| 2013/0187915 A1* | 7/2013 | Lee | G06T 9/001 |
| | | | 345/420 |
| 2014/0274154 A1* | 9/2014 | Rana | G06Q 50/01 |
| | | | 455/456.3 |
| 2016/0189102 A1* | 6/2016 | Schreiber | G06Q 10/047 |
| | | | 705/338 |
| 2019/0228377 A1* | 7/2019 | Pande | G06Q 10/06315 |
| 2020/0193550 A1* | 6/2020 | Colonna | H04W 4/021 |
| 2020/0351655 A1* | 11/2020 | Sunkavally | H04L 63/205 |
| 2020/0356114 A1* | 11/2020 | Uçar | G08G 5/0034 |

OTHER PUBLICATIONS

Nair Ashwin, "GeoRaptor: Python Geohash Compression Tool", GitHub, https://github.com/ashwin711/georaptor, captured Dec. 22, 2020, 4 pages.

* cited by examiner

CATCHMENT MODELING

BACKGROUND

Last mile delivery, also called final mile, is the last stage in delivery of products being delivered from a store or fulfillment center (FC) to a delivery address, such as a customer residence or other delivery location. The last mile delivery process typically involves delivery of small numbers of items or even a single item to the delivery address. Carriers making the last mile delivery may further have travel distance limitations and other requirements. Therefore, it can be important to know the actual driving distance from the store or FC to the delivery address. These distances are frequently determined based on aerial distances, which can be inaccurate and lacking in precision due to significant differences in distance determined based on straight-line aerial distances versus actual driving distance over roads, which rarely permits straight-line travel from a departure point to a destination. Thus, last mile delivery can be the most inefficient, expensive, and potentially complex portion of the delivery process due to difficulties associated with delivery of small numbers of items to a wide variety of customer addresses and difficulties associated with accurately determining driving distances.

SUMMARY

Some examples provide a computer-implemented method for determining whether a destination address falls within a catchment area of a source location. A catchment area within a polygon fence surrounding a source location is divided into a plurality of blocks. The polygon fence includes a plurality of fence points located a predetermined distance from the source location. The plurality of blocks includes a set of inclusion points and a set of exclusion points. An inclusion point is a travel distance point having a travel distance from the source location less than or equal to the predetermined distance. An exclusion point is a travel distance point having a travel distance from the source location greater than the predetermined distance. Data compression is performed on geohash data representing the plurality of blocks via a polygon merging data compression model. The compressed geohash data represents the set of inclusion points and the set of exclusion points. The compressed geohash data is stored in a data store. A delivery address is approved for last mile delivery if the address corresponds to at least one inclusion point within the polygon fence.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Figure 1:
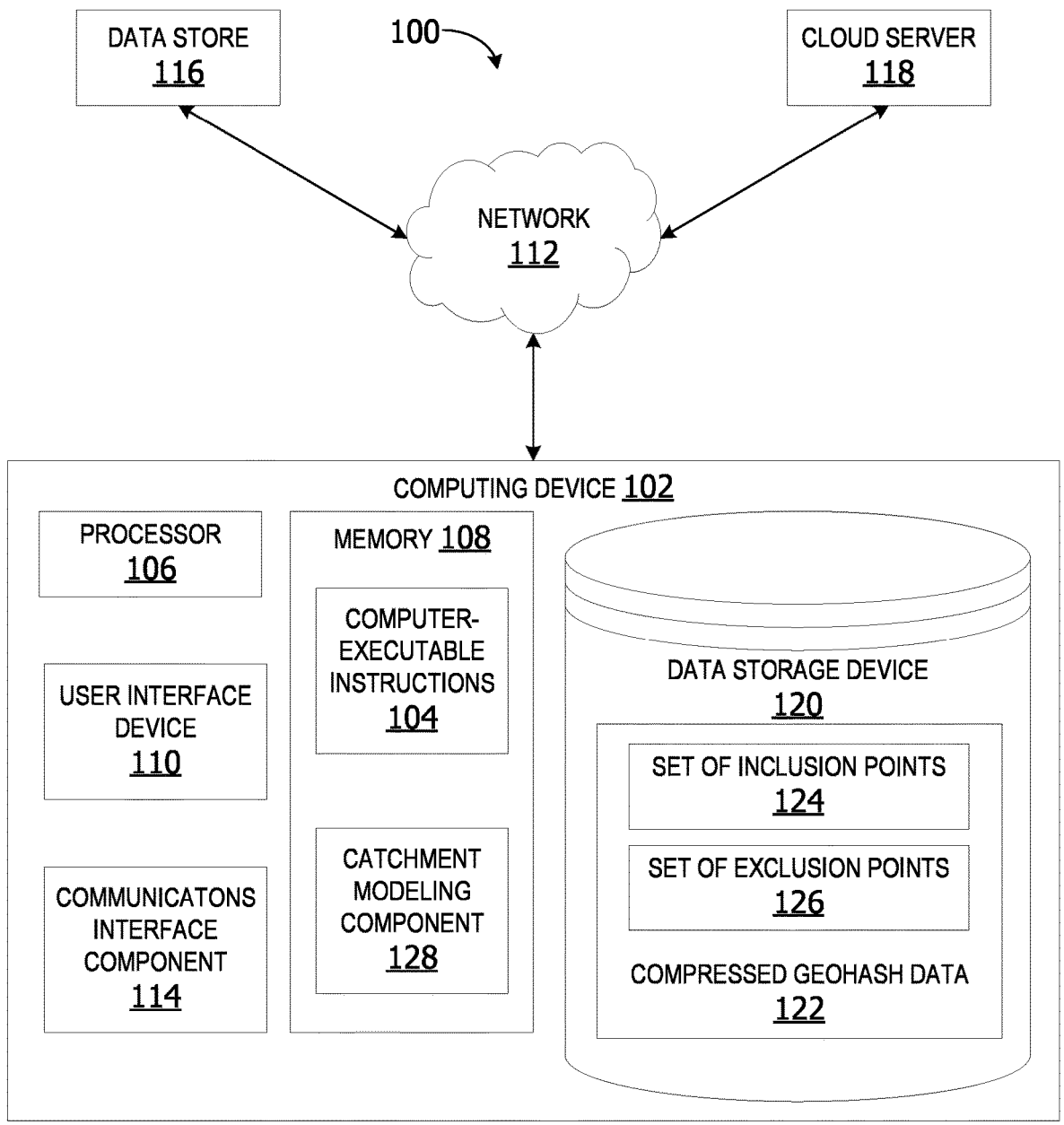
FIG. 1 is an exemplary block diagram illustrating a system for store catchment modeling.

A more detailed understanding can be obtained from the following description, presented by way of example, in conjunction with the accompanying drawings. The entities, connections, arrangements, and the like that are depicted in, and in connection with the various figures, are presented by way of example and not by way of limitation. As such, any and all statements or other indications as to what a particular figure depicts, what a particular element or entity in a particular figure is or has, and any and all similar statements, that can in isolation and out of context be read as absolute and therefore limiting, can only properly be read as being constructively preceded by a clause such as "In at least some examples, . . . " For brevity and clarity of presentation, this implied leading clause is not repeated ad nauseum.

An e-commerce business can receive thousands of orders for delivery to customers every minute. Preparing these orders for delivery typically require evaluation of sources for provision of the ordered items and carriers for delivery of the items. It is frequently important to identify an eligible source quickly and accurately and/or carrier (national or crowd sourced) available for last mile delivery within a predetermined distance from the selected source.

Identifying eligible sources based on aerial distance can be inaccurate or unreliable. For example, if aerial distance between a source and destination is nine miles (point to point distance), the best-case drivable distance will be nine miles (when there is a direct straight-line road between the source and destination. In cases where a straight-line road is not available, the drivable distance is greater than nine miles. Therefore, a catchment area around a store or other center point cannot simply be created by identifying an area around the store having a radius of a predetermined "X" maximum distance from the store without including locations within the catchment area that exceed the predetermined "X" maximum distance.

Referring to the figures, examples of the disclosure enable store catchment area modeling. As used herein, the term store refers to a source of an item. A store can include a brick-and-mortar retail store, an order fulfillment center, a warehouse, a distribution center (DC) or any other source for one or more items that are to be delivered to a destination. The term destination refers to an address, location, coordinates, or other location-related information associated with a customer residence or other delivery address to which one or more items are to be delivered.

In some examples, a catchment modeling component divides a catchment area within a polygon fence surrounding a store or other source location into a plurality of blocks. The blocks vary in size as the blocks approach the fence points. The block size is reduced or decreased as the blocks approach the fence point for increased precision in determining whether an address is within a predetermined maximum delivery travel distance from the store. This improves accuracy of the last mile delivery approval process while reducing errors in the inclusion determination for delivery addresses near the fence points.

In other examples, a data compression model performs data compression on inclusion and exclusion points data via polygon merging. This reduces the amount of data that is cached for improved storage efficiency, reduced resource utilization and faster inclusion point determination by the catchment modeling system.

In still other examples, the compressed geohash data is cached such that parent nodes and virtual parent nodes are cached to reduce the in a data storage device. The caching of virtual parent data reduces cache utilization, eliminates caching of redundant data, and improves speed of accessing cached data.

The system, in some examples, compares a received destination address with cached inclusion points associated with a catchment area for a potential source. The system identifies last mile delivery sources for customers within one millisecond using cached data for reduced processor usage calculating catchment inclusion points.

The computing device performing the catchment modeling operates in an unconventional manner by sub-dividing a catchment area into a plurality of sub-polygons and caching compressed geohashed data to conserve memory, increase processing speed, and improving accuracy of the last mile delivery determination while reducing system resource usage, thereby improving the functioning of the underlying computing device.

The caching of compressed data enables scalability for servicing any number of customers and item orders. The scalability further enables the system to evaluate thousands of potential source locations quickly and accurately for item delivery within one millisecond.

Referring again to FIG. 1, an exemplary block diagram illustrates a system 100 for store catchment area modeling. In the example of FIG. 1, the computing device 102 represents any device executing computer-executable instructions 104 (e.g., as application programs, operating system functionality, or both) to implement the operations and functionality associated with the computing device 102. The computing device 102, in some examples, includes a mobile computing device or any other portable device. A mobile computing device includes, for example, but without limitation, a mobile telephone, laptop, tablet, computing pad, netbook, gaming device, and/or portable media player. The computing device 102 can also include less-portable devices such as servers, desktop personal computers, kiosks, or tabletop devices. Additionally, the computing device 102 can represent a group of processing units or other computing devices.

In some examples, the computing device 102 has at least one processor 106 and a memory 108. The computing device 102, in other examples, includes a user interface device 110.

The processor 106 includes any quantity of processing units and is programmed to execute the computer-executable instructions 104. The computer-executable instructions 104 is performed by the processor 106, performed by multiple processors within the computing device 102 or performed by a processor external to the computing device 102. In some examples, the processor 106 is programmed to execute instructions such as those illustrated in the figures (e.g., FIG. 13, FIG. 14, and FIG. 15).

The computing device 102 further has one or more computer-readable media, such as the memory 108. The memory 108 includes any quantity of media associated with or accessible by the computing device 102. The memory 108, in these examples, is internal to the computing device 102 (as shown in FIG. 1). In other examples, the memory 108 is external to the computing device (not shown) or both (not shown). The memory 108, in other non-limiting examples, can include read-only memory.

The memory 108 stores data, such as one or more applications. The applications, when executed by the processor 106, operate to perform functionality on the computing device 102. The applications can communicate with counterpart applications or services such as web services accessible via a network 112. In an example, the applications represent downloaded client-side applications that correspond to server-side services executing in a cloud.

In other examples, the user interface device 110 includes a graphics card for displaying data to the user and receiving data from the user. The user interface device 110 can also include computer-executable instructions (e.g., a driver) for operating the graphics card. Further, the user interface device 110 can include a display (e.g., a touch screen display or natural user interface) and/or computer-executable instructions (e.g., a driver) for operating the display. The user interface device 110 can also include one or more of the following to provide data to the user or receive data from the user: speakers, a sound card, a camera, a microphone, a vibration motor, one or more accelerometers, a BLUETOOTH® brand communication module, global positioning system (GPS) hardware, and a photoreceptive light sensor. In a non-limiting example, the user inputs commands or manipulates data by moving the computing device 102 in one or more ways.

The network 112 is implemented by one or more physical network components, such as, but without limitation, routers, switches, network interface cards (NICs), and other network devices. The network 112 is any type of network for enabling communications with remote computing devices, such as, but not limited to, a local area network (LAN), a subnet, a wide area network (WAN), a wireless (Wi-Fi) network, or any other type of network. In this example, the network 112 is a WAN, such as the Internet. However, in other examples, the network 112 is a local or private LAN.

In some examples, the system 100 optionally includes a communications interface component 114. The communications interface component 114 includes a network interface card and/or computer-executable instructions (e.g., a driver) for operating the network interface card. Communication between the computing device 102 and other devices, such as but not limited to a remote data store 116 and/or a cloud server 118, can occur using any protocol or mechanism over any wired or wireless connection. In some examples, the communications interface component 114 is operable with short range communication technologies such as by using near-field communication (NFC) tags.

The data store 116 is a component, such as, but not limited to, a remote data storage for storing or caching data, a data store associated with a data center, a backup data storage, a cloud storage, or any other type of data store. The data on the data store may be stored within a file system and/or a database.

In some examples, the data store 116 generates data, such as, but not limited to, compressed geohash data 122. The compressed geohash data 122 is transmitted from the data store 116 to a main data storage device 120 associated with the computing device 102. The data store 116 pushes the data to the main data storage device via the network 112.

The cloud server 118 is a logical server providing services to the computing device 102 or other clients, such as, but not limited to, a user device. The cloud server 118 is hosted and/or delivered via the network 112. In some non-limiting examples, the cloud server 118 is associated with one or more physical servers in one or more data centers. In other examples, the cloud server 118 is associated with a distributed network of servers.

The system 100 can optionally include a data storage device 120 for storing data, such as, but not limited to compressed geohash data 122. The compressed geohash data 122 includes a set of inclusion points 124 representing potential delivery addresses that are located within a predetermined maximum distance from the source location. A destination or other delivery address corresponding to an inclusion point in the set of inclusion points 124 for a given store is eligible for delivery from the given store to the destination.

The compressed geohash data 122, in other examples, includes a set of exclusion points 126. The set of exclusion points 126 represents addresses or locations within the catchment area or proximate to the catchment area that are located a driving distance from the given store that is greater than the maximum allowed driving distance. In other words, the exclusion points are points that are located a greater distance from the store than a predetermined maximum distance. Therefore, a destination (delivery addresses) corresponding to an exclusion point is ineligible for delivery from the given store to the destination.

The data storage device 120 can include one or more different types of data storage devices, such as, for example, one or more rotating disks drives, one or more solid state drives (SSDs), and/or any other type of data storage device. The data storage device 120 in some non-limiting examples includes a redundant array of independent disks (RAID) array. In other examples, the data storage device 120 includes a database. In other examples, the data storage device 120 includes a cache.

The data storage device 120, in this example, is included within the computing device 102, attached to the computing device, plugged into the computing device, or otherwise associated with the computing device 102. In other examples, the data storage device 120 includes a remote data storage accessed by the computing device via the network 112, such as a remote data storage device, a data storage in a remote data center, or a cloud storage.

The catchment modeling component is a software component which divides a catchment area into a plurality of blocks and performs geohashing on the blocks to identify inclusion and exclusion points for a given store. A block in the plurality of blocks is a geohash block or sub-polygon within the catchment area. The plurality of blocks is generated by sub-dividing the catchment area into the plurality of blocks.

The geohash data is compressed and stored. In some examples, the compressed data is cached for usage in determining whether destination addresses for customer orders are within the predetermined distance from a given store. This compressed geohash data is used to approve or disapprove a given store for delivery of ordered items to a customer address.

The predetermined distance is a user-configured maximum distance "X" from the source location. The predetermined distance may be specified in miles, meters, or any other unit of distance measurement. In some non-limiting examples, the predetermined distance is nine miles. In other examples, the predetermined distance is eight miles. In still other examples, the predetermined distance is twelve miles or any other user-selected distance.

In some examples, the catchment modeling component includes inclusion logic which takes a selected store as a center point of a polygon/catchment area. The system obtains travel distance points which are eligible for store last mile delivery. The system hashes the travel distance points and caches them in a virtual machine using data compression/polygon merging. The system enables last mile delivery for any customer address falling within the identified inclusion points.

In other examples, exclusion logic takes a store location as the center point of the catchment area. A polygon fence boundary is created with the store's latitude and longitude as the center reference point. For each bearing (starting from 0 degree to 360 degrees), the catchment modeling component identifies the fence point which is the predetermined maximum travel distance "X" miles distance away. The system calculates the actual drivable distance from the store location to this fence point. If the drivable distance is equal to the threshold "X" miles, this is the final fence point for the given bearing. If not, the system continues moving towards the store's location from the fence point using an incremental step size and for every new fence point check the drivable distance.

The catchment modeling component 128 generates polygons for inclusion/exclusion point generation based on the pre-defined threshold maximum number of miles travel distance around the identified store (node). In some examples, polygons are generated with very small size to improve accuracy. The identified sub-polygons center point is verified to determine if the sub-polygons exist within the required travel distance. A fence is generated around the node. Each fence point in the fence is located the pre-defined threshold maximum number of miles from the source. The system generates all possible polygons within the fence of the polygon fence defined catchment area.

In some examples, non-travel distance points are obtained which are ineligible for store last mile delivery. The points are hashed. The geohashed points are cached in a virtual machine. Last mile delivery is enabled for delivery to any customer address not falling within the identified exclusion points.

In other examples, the catchment modeling component 128 performs data compression by merging intersecting polygons. The data compression is unique to reduce the data. Geohashing implicitly provides a parent-child relationship used for data compression. Each parent geo hash block can be broken down into children blocks. If all the child blocks for a common parent have the same property (i.e., either all of them are part of exclusion set, or all of them are part of inclusion set), the catchment modeling component store the parent's information instead of keeping all children's data.

In some examples, the service level agreement (SLA) of the service including a selected store for delivery of the item(s) is generated within one millisecond, such that the catchment modeling system can be integrated with several site facing applications.

The system 100, in still other examples, generates a set of one or more available source locations for delivery of one or more items to a destination address and an actual travel distance between the destination address and each source location in the set of available source locations. An available source location is a source location having the one or more items in stock or otherwise available for delivery to the user and/or pickup by the user.

The system filters an initial list of all possible source locations capable of delivering the one or more items selected by the user for purchase or delivery to eliminate any source locations associated with an exclusion point (outside the catchment area. The system also filters/removes any source locations from the list in which the destination address is located within the source location catchment area but having an actual distance from the source location to the destination address which exceeds the predetermined maximum threshold travel distance.

In these non-limiting examples, a list of possible source locations are presented to the user via a user interface. The list includes each source location having an actual travel distance by road/ground vehicle that is less than or equal to the maximum threshold travel distance. The list presented to the user includes an identification of each source location eligible for last mile delivery and the actual distance between each source location and the destination address. The user can optionally select a source location from the list of last mile delivery eligible source locations from which to receive the ordered one or more items.

Figure 2:
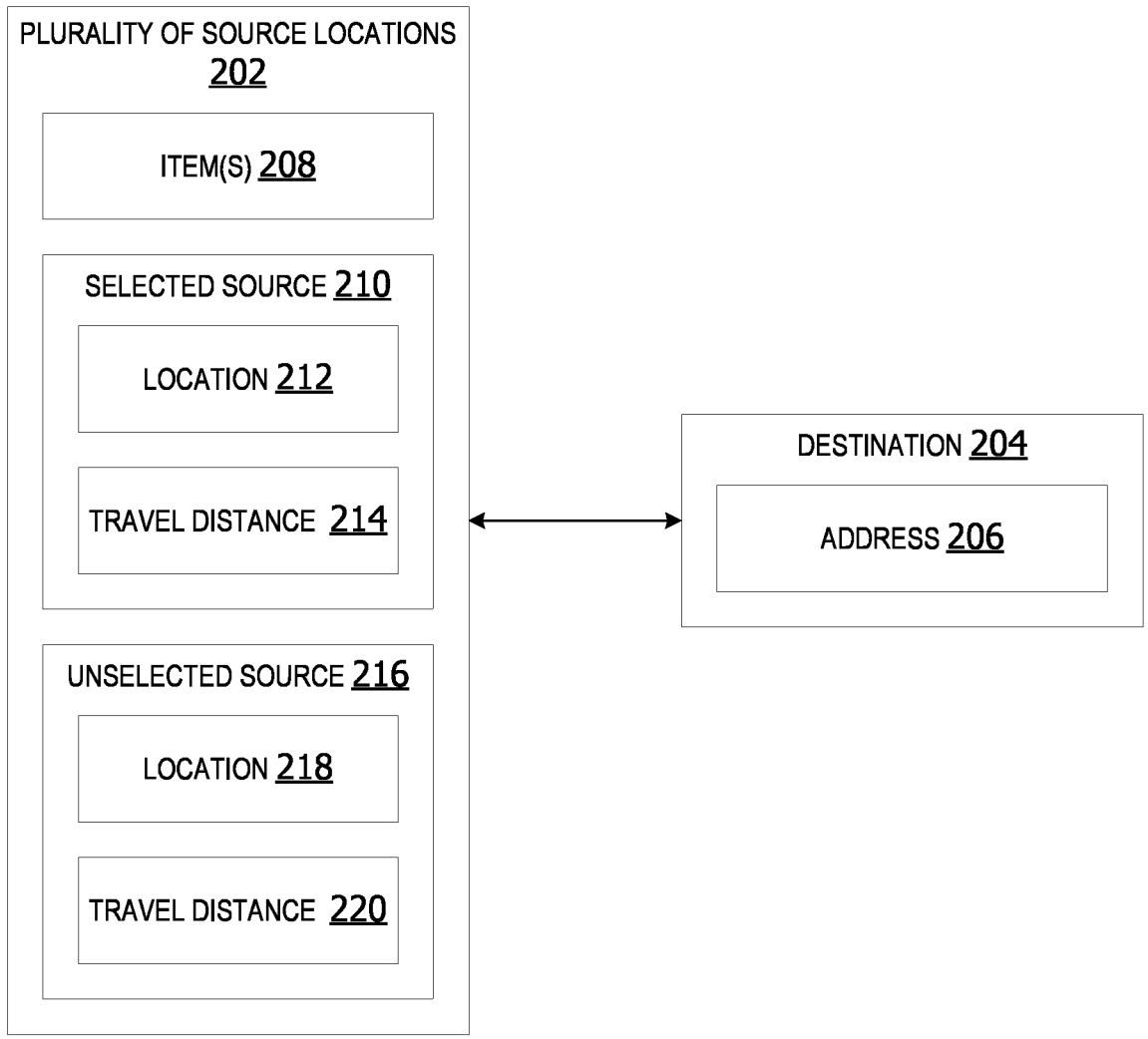
FIG. 2 is an exemplary block diagram illustrating a plurality of source locations associated with at least one destination address.

FIG. 2 is an exemplary block diagram illustrating a plurality of source locations 202 associated with at least one destination 204 address 206. The plurality of source locations 202 includes one or more sources of one or more item(s) 208. The item(s) are items ordered or purchased by a customer or otherwise selected for delivery to a customer at the destination 204 address 206. The destination 204 can be any type of address, such as, but not limited to, a residence or business address. A residence can include a single-family house, a multi-family house, an apartment, a duplex, a condominium, a post office (P.O.) box, or any other delivery address. A source in the plurality of source locations 202 can include, without limitation, a store, FC, warehouse, or any other source of the item(s).

The plurality of source locations 202 can include a selected source 210 having a location 212 that is within a predetermined travel distance from the destination 204. The predetermined travel distance is a user-configured threshold maximum travel distance from the source to the destination. A source location 212 that is located a calculated travel distance 214 from the destination 204 that is less than or equal to the maximum threshold (predetermined distance) distance is eligible for delivery from the source to the destination.

A selected source 216 at a location 218 that is located a calculated travel distance 220 from the destination 204 address 206 that is greater than the predetermined maximum travel distance is ineligible for delivery from the selected source 216. In some examples, addresses that are ineligible for delivery from a given source is located within an exclusion block of the unselected source 216.

Figure 3:
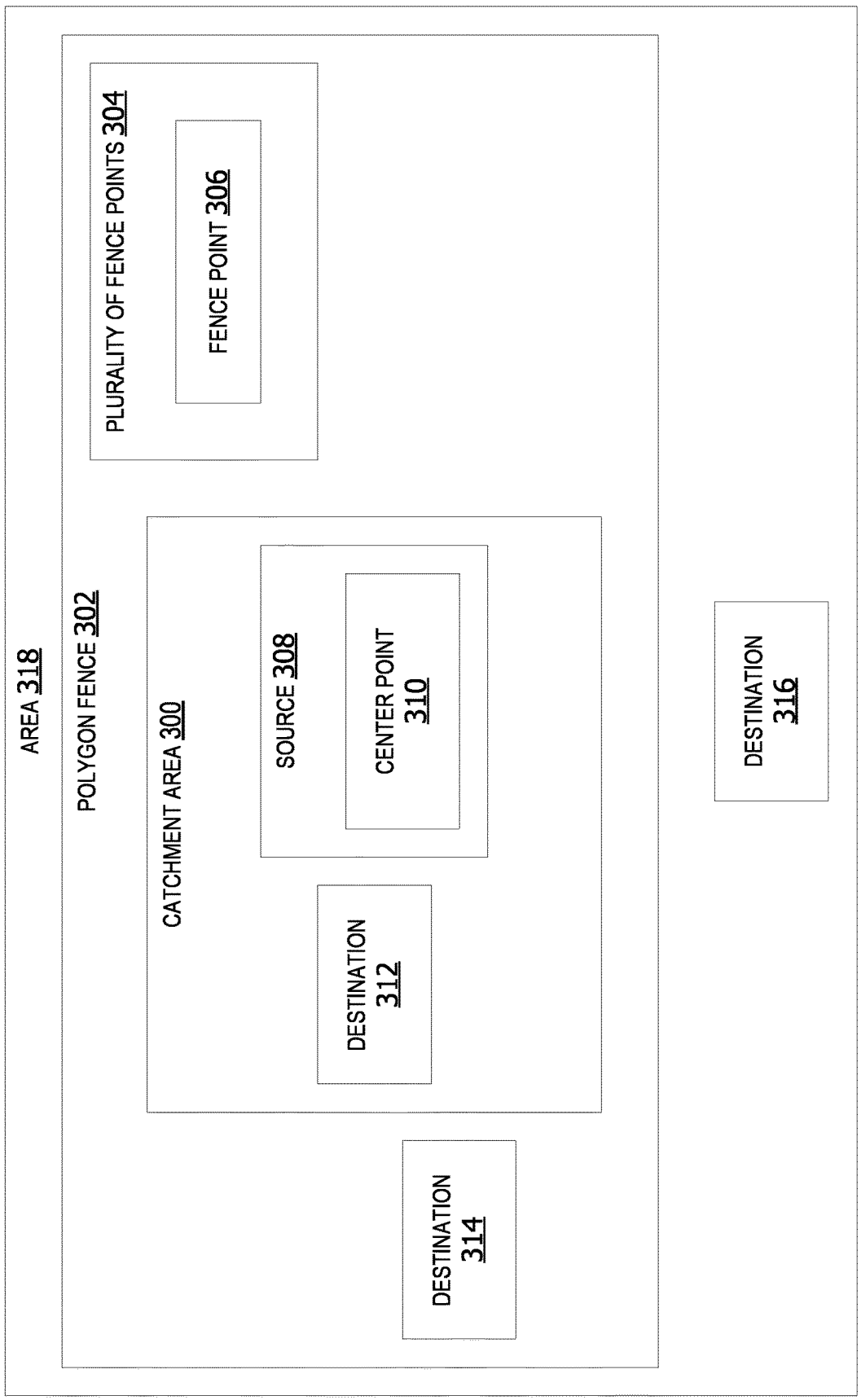
FIG. 3 is an exemplary block diagram illustrating a catchment area within a polygon fence.

FIG. 3 is an exemplary block diagram illustrating a catchment area 300 within a polygon fence 302. The catchment area 300 is a geographic area served by a store, fulfillment center or other source of goods. The size and shape of the catchment area varies.

The polygon fence 302 includes a plurality of fence points 304 forming a partial perimeter around the outer bounds of the catchment area 300. The catchment area 300 is a delivery zone or area within a delivery zone for a source 308. The source 308 is taken as the center-point or substantially the center points of the catchment area. A destination 312 located within the catchment area and/or corresponding to an inclusion point is eligible for delivery from the source 308 to the destination 312.

In other examples, a destination 314 located at the polygon fence 302, near the polygon fence, and/or overlapping the polygon fence forming the outer boundary of the catchment area may be within an inclusion block or may be within an exclusion block. If the destination 314 is within an inclusion block, the destination is eligible for delivery of one or more items from the source 308 to the destination 314. If the destination 314 is located within an exclusion block is not eligible for delivery from the source 308 to the destination 314.

In other examples, a destination 316 located in an area 318 outside the catchment area 300 and the polygon fence 302 is ineligible for delivery of one or more items from the source 308 to the destination 316 because the distance between the source 308 and the destination 316 exceeds the predetermined maximum travel distance.

Figure 4:
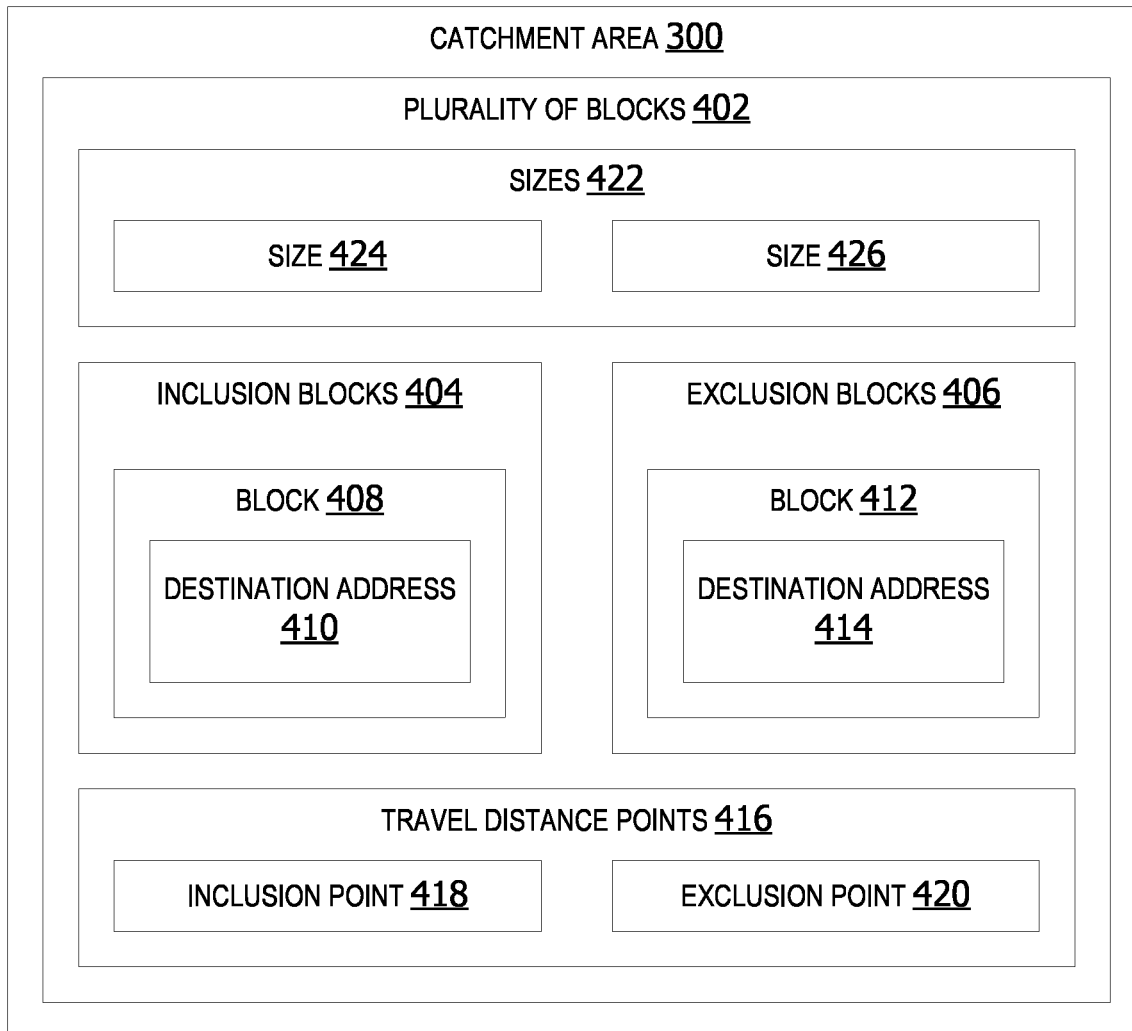
FIG. 4 is an exemplary block diagram illustrating a catchment area divided into a plurality of blocks.

FIG. 4 is an exemplary block diagram illustrating a catchment area 300 divided into a plurality of blocks 402. The system generates all possible polygons within the polygon fence of the consumer defined catchment area. In some examples, the blocks are geohash blocks or sub-polygons within the catchment area. The blocks may be of uniform size or of varying size. In this example, the size of the blocks varies such that the blocks nearer to the center point are larger than the blocks nearer to the polygon fence points.

The plurality of blocks 402 includes a set of inclusion blocks 404 and/or a set of exclusion blocks 406. An inclusion block is a block 408 including one or more inclusion points. A point is a geographic point. A point can be represented by coordinates, such as longitude and latitude coordinates. An inclusion point 418 is a travel distance point in the travel distance points 416 located a travel distance from the source location that is less than or equal to the predetermined distance. A travel distance point can be an inclusion point 418 and/or an exclusion point 420.

In other examples, the set of exclusion blocks 406 include one or more exclusion blocks. An exclusion block 412 is a grid space including at least one exclusion point 420 that is located a travel distance from the source location that is greater than the predetermined distance.

Thus, a destination address 410 that is associated with an inclusion block 408 is eligible for delivery of item(s) from the source associated with the catchment area 300 to the destination address 410. A destination address 414 that is associated with an exclusion block 412 is ineligible for delivery of item(s) from the source associated with the catchment area 300 to the destination address 410.

In some examples, the plurality of blocks includes one or more sizes 422. In some examples, as the blocks in the plurality of blocks approach the polygon fence points, the size of the blocks decrease for increased precision in the distance determinations for each block.

In some examples, a first set of blocks within the plurality of blocks has a first size 424 which is smaller than a second size 426 of a second set of blocks within the plurality of blocks 402. In one example, the first set of blocks are 150 meters by 150 meters while the second set of blocks are 100 meters by 100 meters. In still other examples, a third set of blocks are 50 meters by 50 meters in size.

Figure 5:
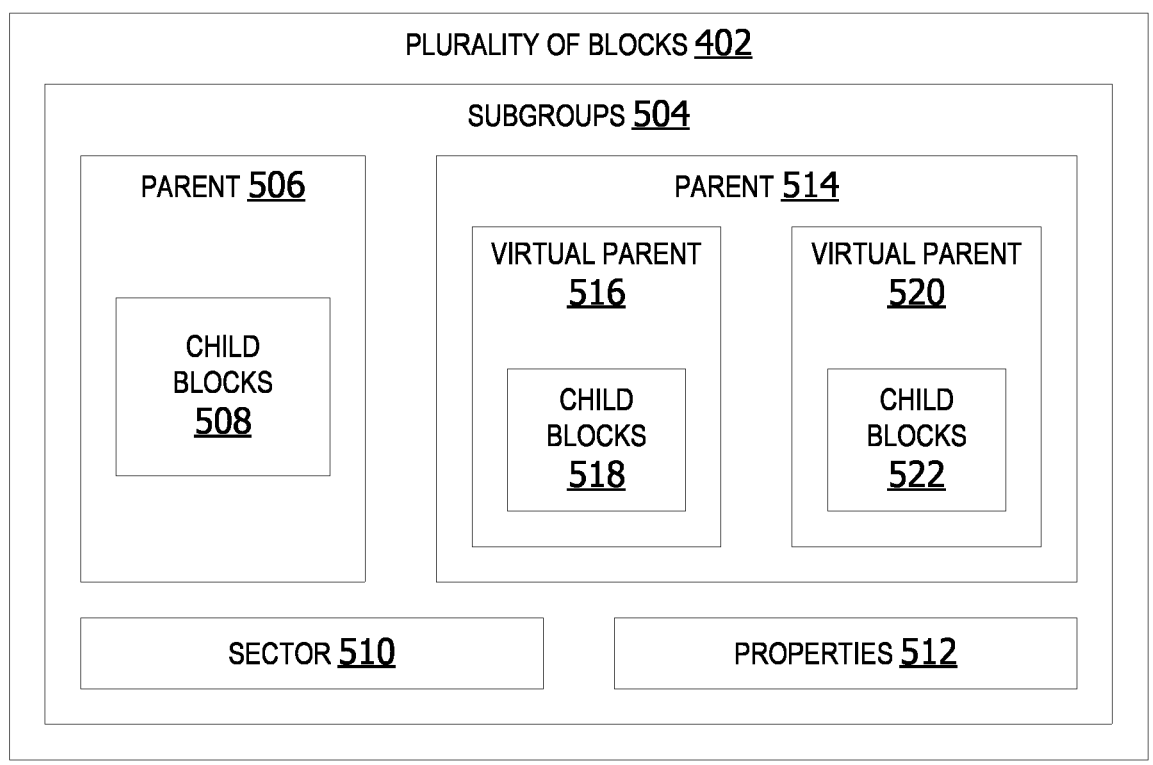
FIG. 5 is an exemplary block diagram illustrating a plurality of blocks associated with a catchment area for a selected source.

FIG. 5 is an exemplary block diagram illustrating a plurality of blocks 402 associated with a catchment area for a selected source. In some examples, the plurality of blocks 402 are broken into subgroups 504. If all the child blocks 508 associated with a parent 506 block within the same sector 510 and having the same properties 512, only the parent 506 is saved. The child blocks are not cached. All the child blocks have the same properties if all the child blocks are inclusion blocks. All the child blocks have the same properties if all the child blocks are exclusion blocks.

In other examples, if all the child blocks associated with an actual parent 514 do not have the same common properties, the child blocks are subdivided into virtual parent groups. In this example, a first set of one or more child blocks 518 having a first set of the same properties are associated with a first virtual parent 516 and a second set of one or more child blocks 522 having a second set of the same properties are associated with a second virtual parent 520. In this example, the virtual parent 516 and the virtual parent 520 are cached. The child blocks 518 and the child blocks 522 are not cached. This reduces the amount of data which is cached to reduce cache usage and improve retrieval speed from the cache.

Figure 6:
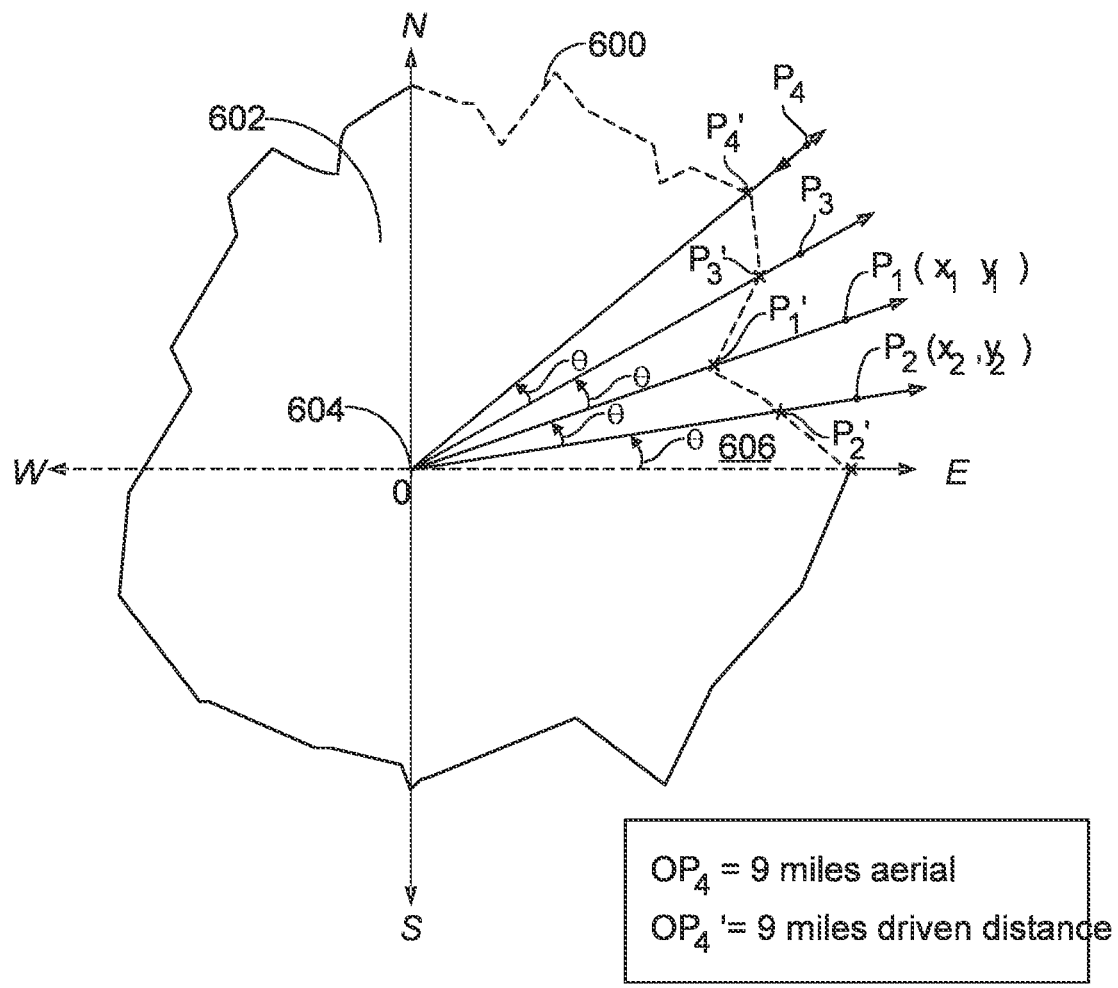
FIG. 6 is an exemplary block diagram illustrating a polygon fence surrounding a catchment area of a source.

FIG. 6 is an exemplary block diagram illustrating a polygon fence 600 surrounding a catchment area 602 of a source 604. The polygon fence 600 is created for each source 604. In some examples the latitude and longitude coordinates of the source 604 is utilized as the center reference point. For each bearing 606 (starting from 0 degree to 360 degrees), the catchment modeling system finds the fence point with is located the predetermined distance "X" from the source 604.

The predetermined distance is a user-configurable maximum threshold distance from the center point (store). The predetermined distance can be, for example but without limitation, eight miles, nine miles, ten miles, or any other user-configured distance.

In some examples, the catchment modeling system finds the fence point located approximately "X" miles aerial distance away from the center point source 604. In this non-limiting example, the source 604 is a store, order fulfillment center or other retail environment. If the predetermined distance "X" is ten miles (10 miles) aerial distance, in this example, all these points have minimal drivable distance of 12 miles due to aerial travel distance permitting straight-line travel between two points while road travel distance typically does not enable straight-line travel between points.

The catchment modeling component calculates the actual drivable distance from the store (center point) location to the fence point. If the drivable distance is equal to the predetermined distance "X", then this is the final fence point for the given bearing. If not, the catchment modeling component continues moving towards the center point store's location from the fence point (using a step size).

The step size or increment block size change may be any user-configurable increment block size change used to move towards the fence points. In some examples, the increment block size change is one-hundred meters. In other examples, the increment block size change is fifty meters. In still other non-limiting examples, the increment block size change is one meter.

For every new fence point, the catchment modeling component check the drivable distance. In other words, the calculated drivable distance is compared to the predetermined travel distance "X". When the system identifies (finds) the first point which is within the predetermined drivable distance, the system stops. This is how, in some examples, a polygon fence is generated around a store's location.

Figure 7:
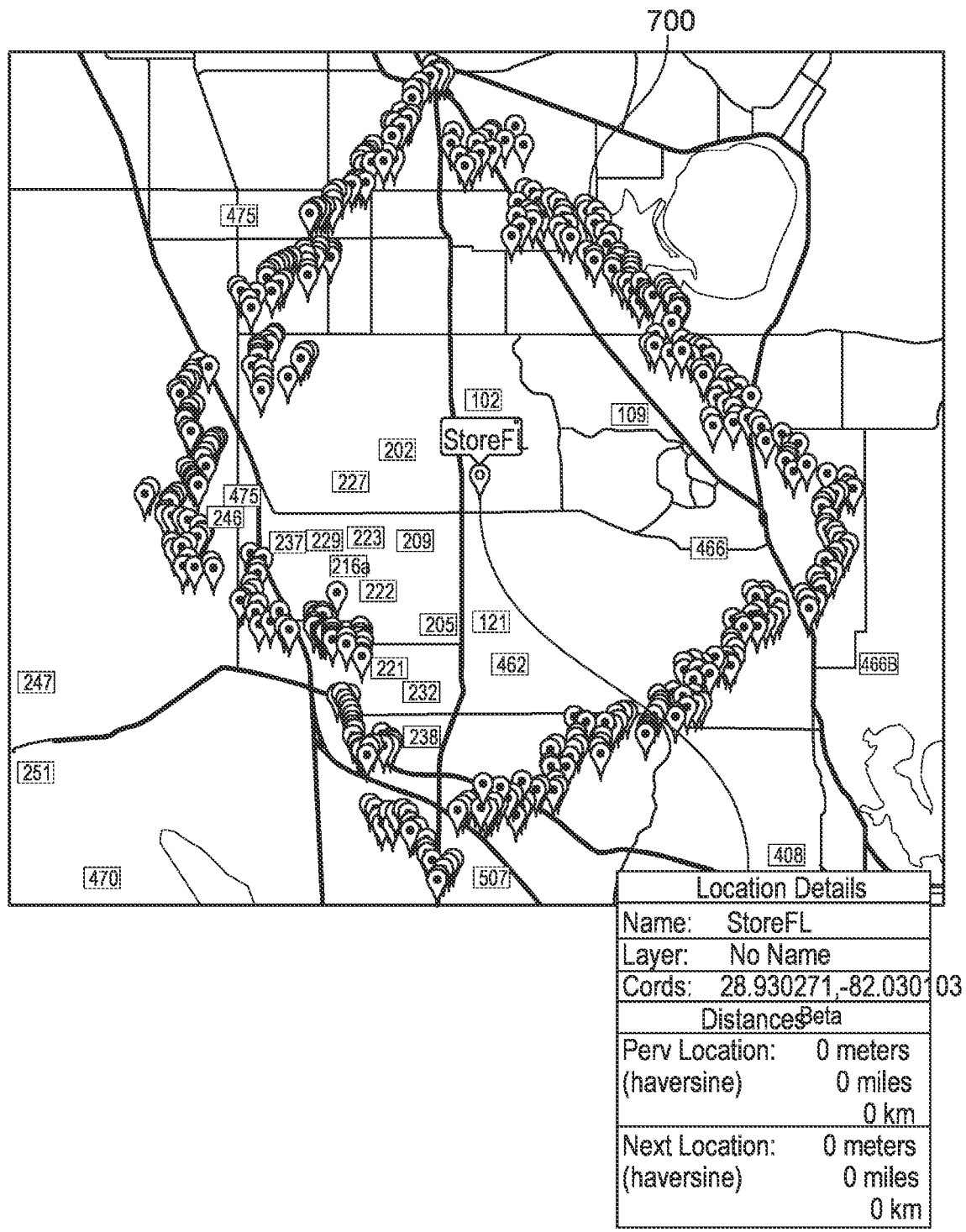
FIG. 7 is an exemplary block diagram illustrating a plurality of fence points associated with a polygon fence.

FIG. 7 is an exemplary block diagram illustrating a plurality of fence points 700 associated with a polygon fence. The plurality of fence points 700 is a plurality of points forming a polygon fence, such as, but not limited to, the plurality of fence points 304 in FIG. 3.

Boundary detection does not necessarily guarantee that all the points within the polygon fence would be within the predetermined distance "X" away from the source's location. There can be several points which are within the polygon boundary, but due to roadway and freeway locations or unavailability of left/right turns, are farther than the required distance.

The system uses a geohashing technique (hierarchical spatial data structure which divides a space into buckets of grid shapes referred to as blocks. For each geohash block, the system again computes the drivable distance from the source (i.e., the centre of the polygon). If the distance is within the required predetermined distance (drivable miles), the geo-block is added to the inclusion list. If the distance is greater than the predetermined distance, the geo-block is added to the exclusion list.

In some examples, both the inclusion list and the exclusion list are saved. In other examples, depending on the size of the two lists, the catchment modeling system only keeps/caches the list with minimal amount of data points. In other words, if the inclusion list has the fewest data points, the inclusion list is cached and the exclusion list is not cached.

Figure 8:
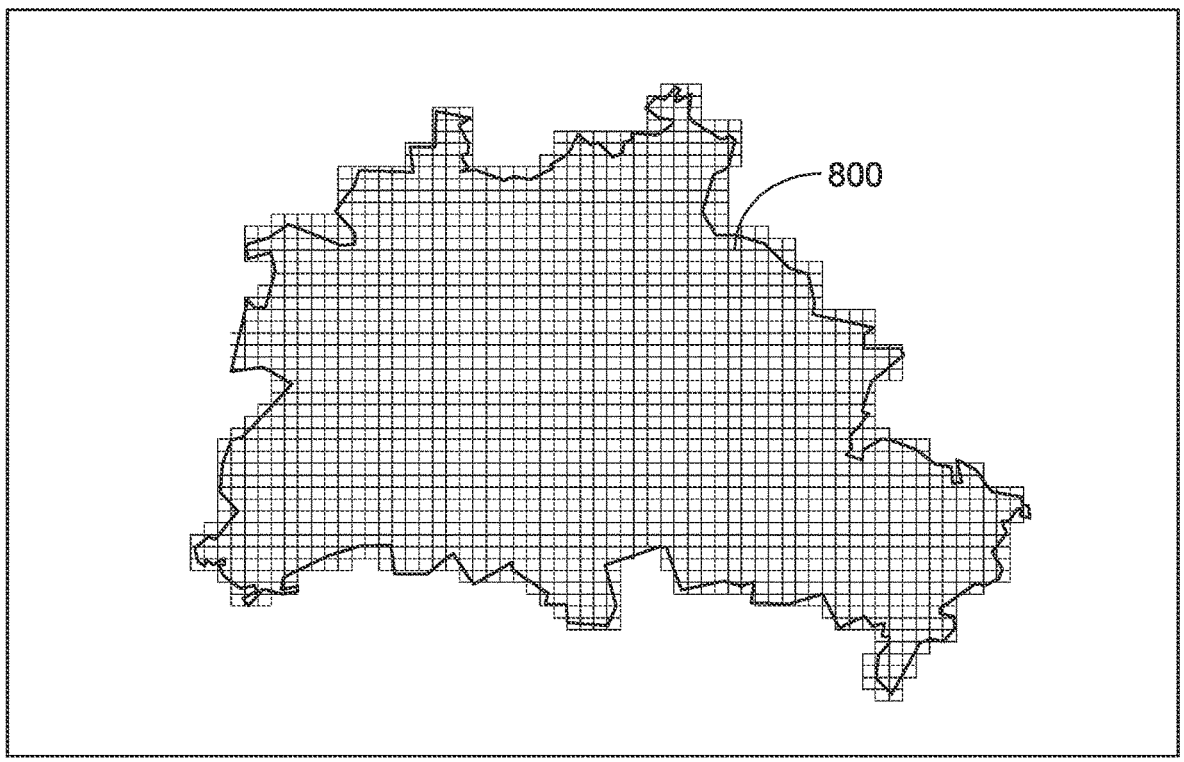
FIG. 8 is an exemplary block diagram illustrating a catchment area divided into a plurality of blocks.

FIG. 8 is an exemplary block diagram illustrating a catchment area 800 divided into a plurality of blocks. The catchment area is broken into blocks having varying size and varying precision to divide the complete polygon into small blocks. In some examples, the size of some of the blocks are 150 m×150 m (i.e., precision of 7) using the geohashing technique. Every 150 m×150 m geo-block had one latitude longitude configuration (essentially the latitude-longitude of the centre of the geo-block). In other examples, the size of at least some of the blocks are 100 m×100 m. In still other examples, the size of at least some of the blocks are 50 m×50 m.

Figure 9:
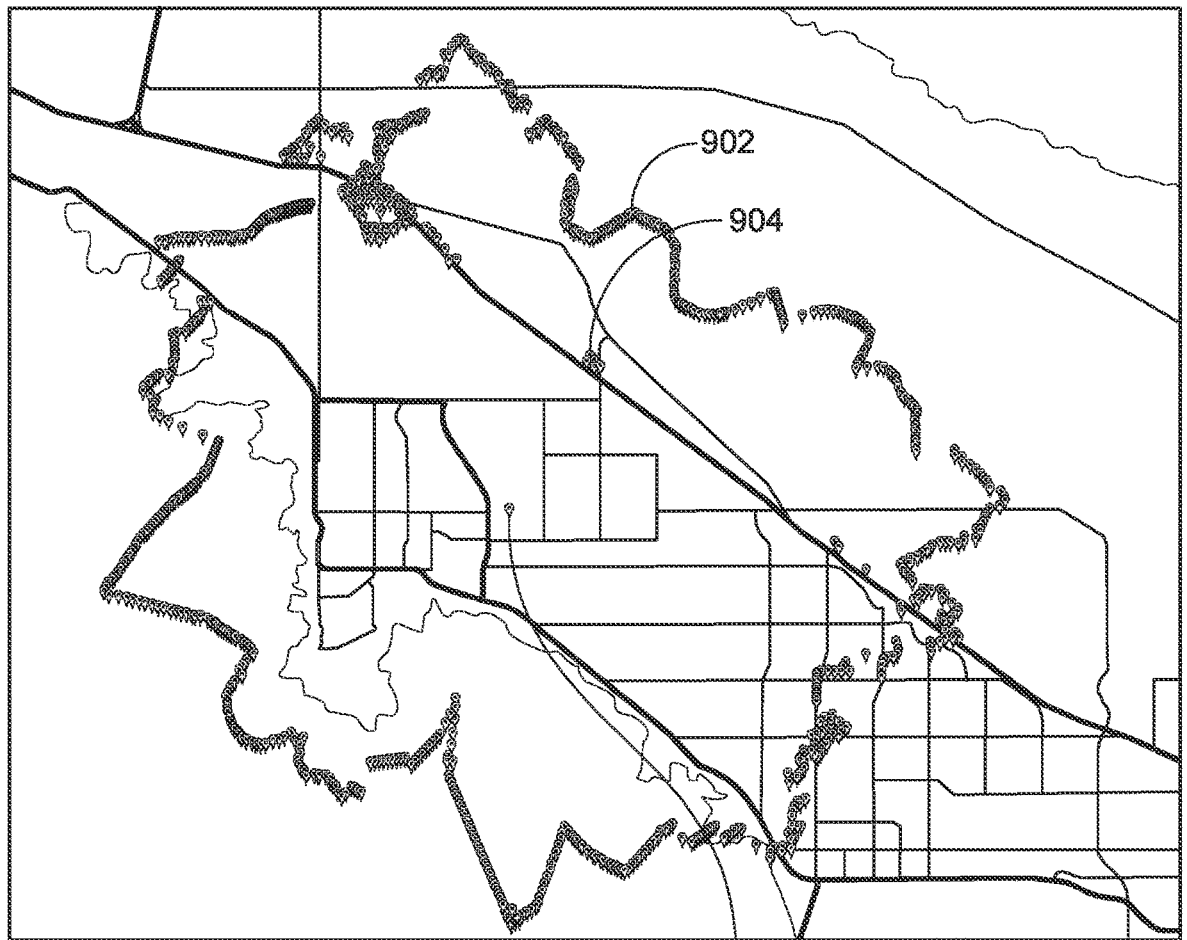
FIG. 9 is an exemplary block diagram illustrating utilization of geo-blocks of varying size for increased precision in detecting inclusion blocks and exclusion blocks.

FIG. 9 is an exemplary block diagram illustrating utilization of geo-blocks of varying size for increased precision in detecting inclusion blocks and exclusion blocks. In this example, near the polygon fence 902 boundary of the catchment area, geo-blocks of size 150 m×150 m may be too large because the geo-blocks could overflow to the outer side of the fence and reduce the accuracy of the algorithm. As the blocks approach the polygon fence boundary, the system increases the precision of the geohashing by decreasing the size of the geo-blocks.

In some non-limiting examples, as the system approaches the polygon fence, the system reduces the size of the blocks to approximately 50 m×50 m. This ensures lower overflow of geo-blocks overlapping the polygon fence and outside the catchment area. Reducing the size of the geo-blocks also ensures higher retention of true positives for the inclusion list. The same mechanism is used for points which were within the polygon but had drivable distance of more than the predetermined "X" distance.

In this non-limiting example, blocks closer to the center point represents the latitude-longitude of the 150 m×150 m geo-block. The blocks closer to the polygon fence 902 represents the latitude-longitudes of 50 m×50 m geo-blocks. To detect accurate exclusions, the system moves to a lower geo-block size. This ensures that none of the blocks are incorrectly marked as outliers. This ensures that no customer location is incorrectly excluded from a store's coverage area.

Most of the exclusion points are detected outside the polygon fence, near/proximate to the polygon fence or overlapping the polygon fence. However, some of the exclusion points may be identified within the polygon fence, such as, but not limited to, the exclusion point 904 shown in FIG. 9. The exclusion points occurring within the polygon fence are locations which are located a distance, by road, that is greater than the predetermined threshold maximum distance from the source location. This can occur where roads leading to an exclusion point wide around or include a number of turns which result in a less direct route to the exclusion point that was possible with regard to one or more of the fence points making up the polygon fence. In other words, a fence point which may have a direct, straight road leading to it may result in a shorter distance in miles between the source and the fence point than the route to an address within the polygon fence which is not accessible via a direct/straight line roadway.

In some examples, an icon or graphic is provided within a graphical user interface display to identify the location of exclusion points within the catchment area of a source. For example, exclusion points may be represented by red markers while fence points are represented by green or blue markers. The examples are not limited to representing exclusion points with red markers/graphic icons. An exclusion point in other examples can be represented by orange markers, yellow markers, or any other color marker. Likewise, exclusion points can be represented by tear shaped icons, circular icons, an "x", or any other type of graphic or icon.

Figure 10:
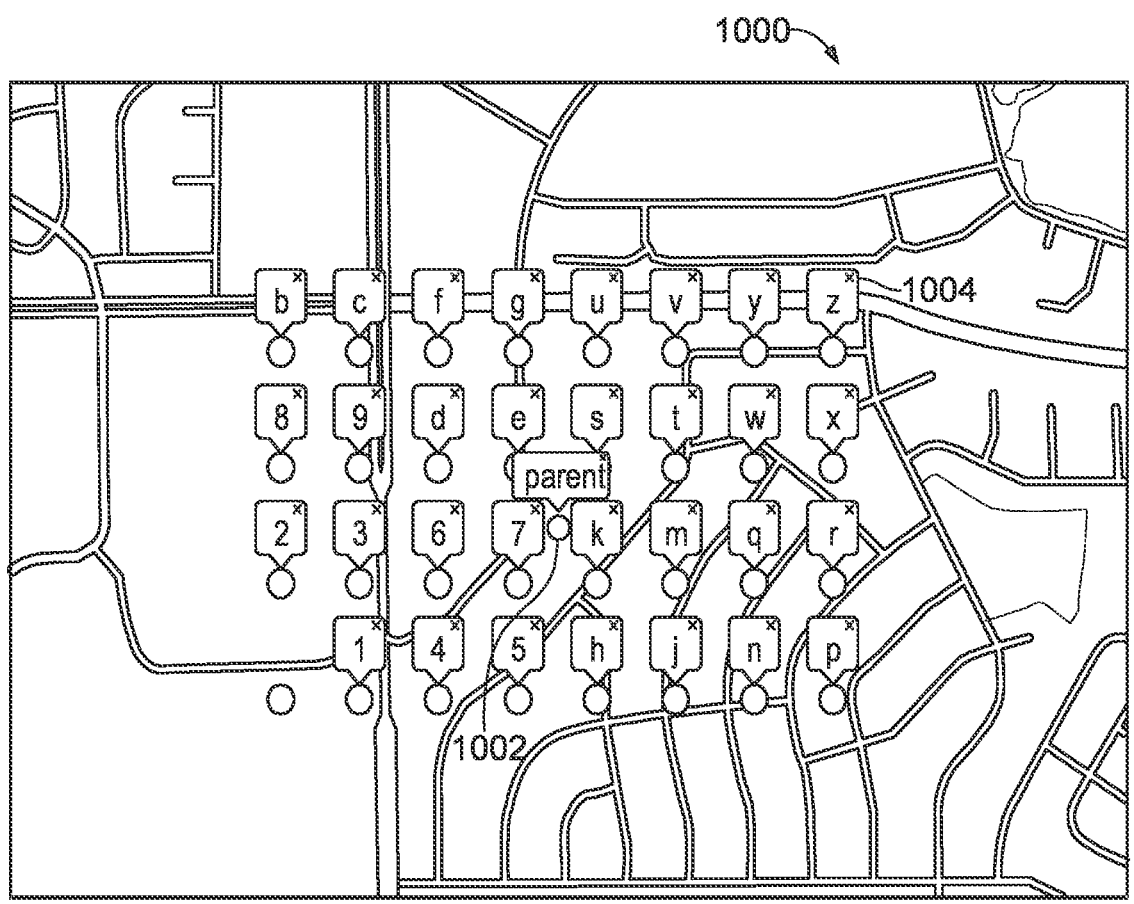
FIG. 10 is an exemplary block diagram illustrating a parent node and a set of thirty-two child nodes.

FIG. 10 is an exemplary block diagram illustrating a parent node and a set of thirty-two child nodes. In some examples, a store location may have thousands of outlier/inlier data points where the store's fence is very skewed. This can lead to increased number of data points for each store and higher memory footprint. The system performs custom data compression to reduce the data being stored.

The system uses a geohashing technique to divide the polygon fence into smaller blocks. Geohashing implicitly provides a parent-child relationship which can be used for data compression. Each parent 1002 geohash block can be broken down into thirty-two child blocks, such as, but not limited to, the child block 1004. If all 32 child blocks have the same property (i.e., either all of them are part of exclusion set, or all of them are part of inclusion set), then instead of keeping the data for all 32 of the child blocks, the system only stores the parent's information.

In some examples, the system divides the thirty-two child blocks into sets of four, depending on the location of these points on the map 1000. Nearby points are part of same set. For example: points 0, 1, 2, 3 are part of one group, points 8, 9, b, c are part of the second group, and so on. So, in totality we generated 8 sub-groups. Each of these 8 sub-groups are represented by (rolled up to) the actual parent.

Figure 11:
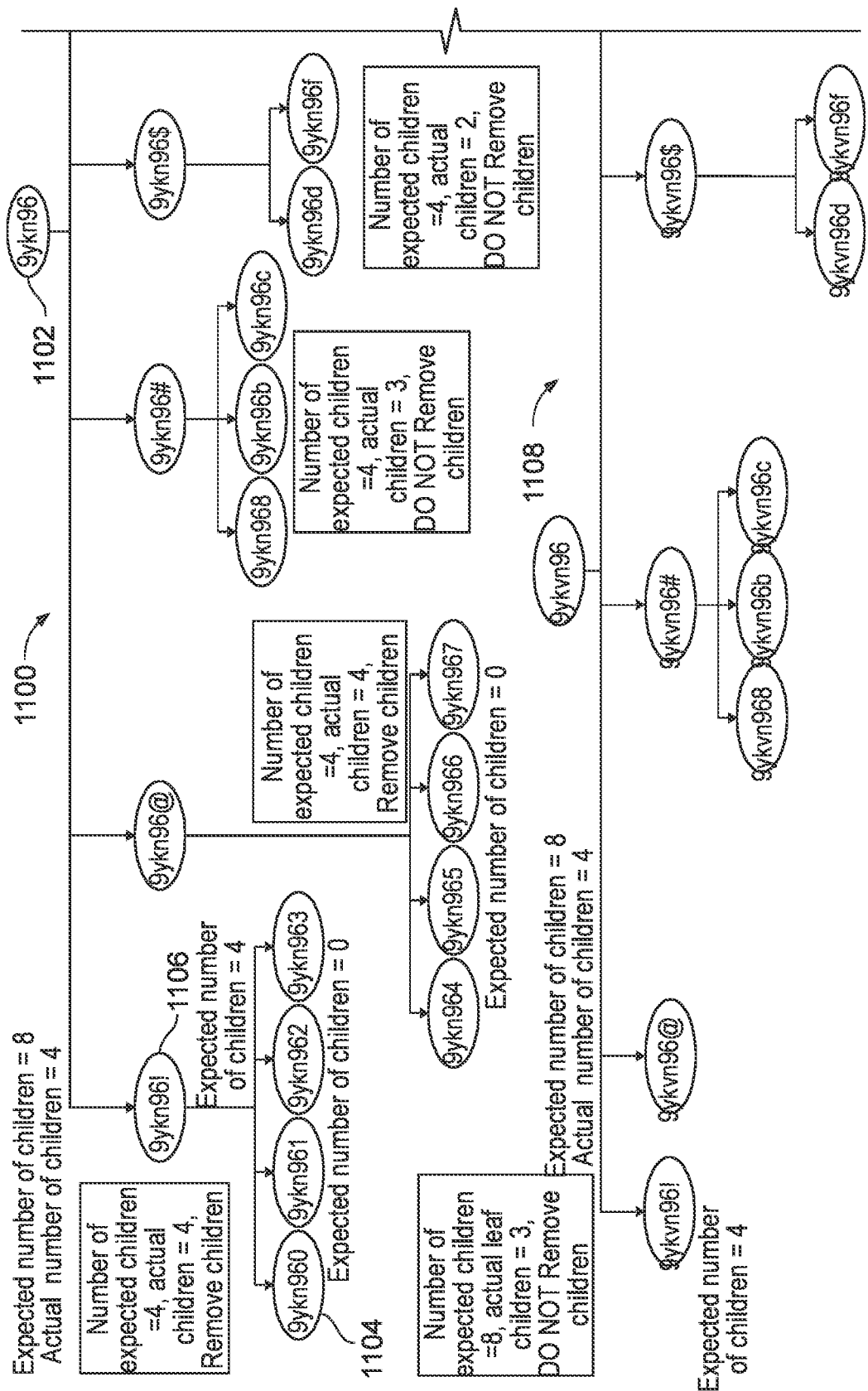
FIG. 11 is an exemplary block diagram illustrating utilization of parent nodes and virtual parent nodes for data compression.
Figure 11:
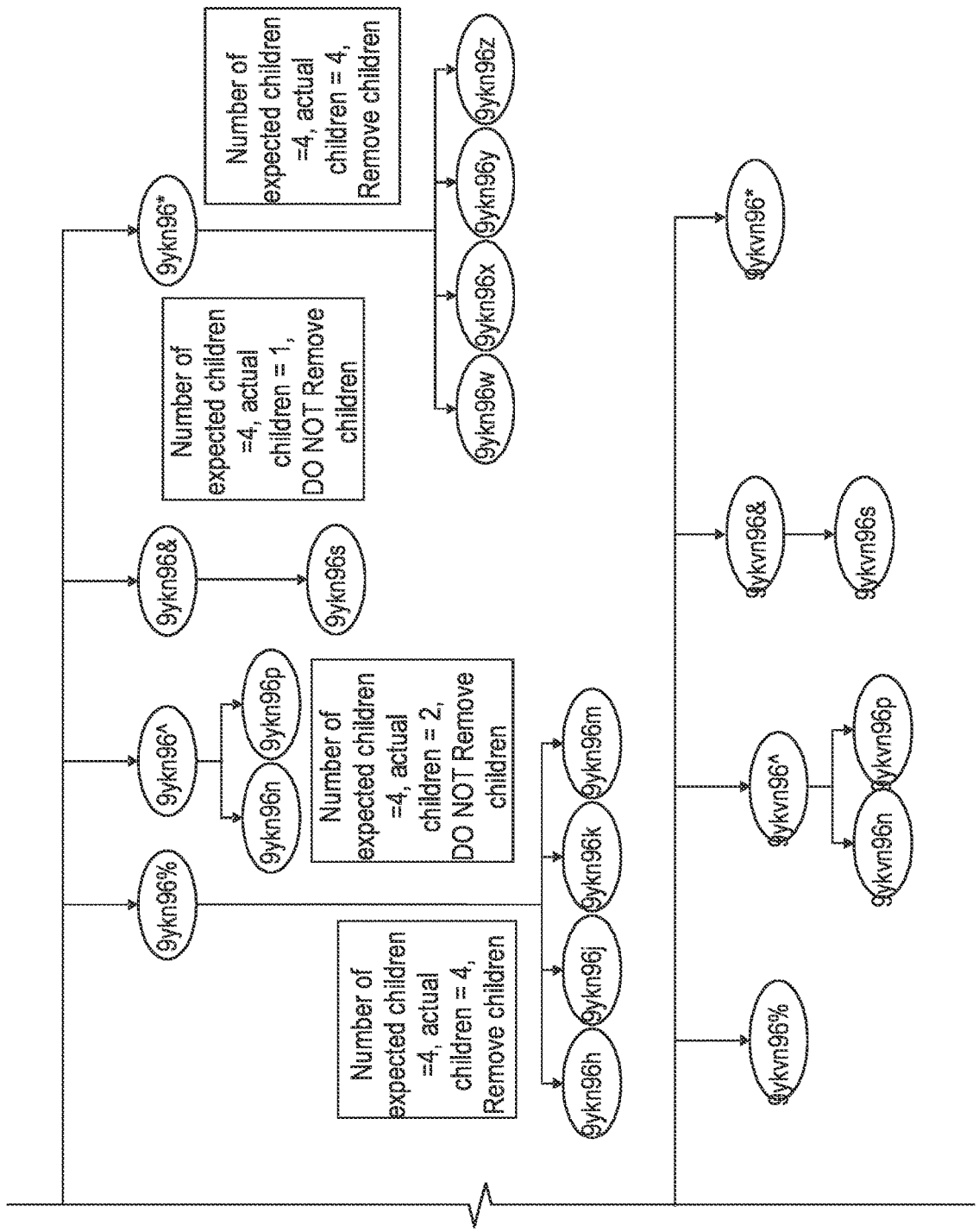

FIG. 11 is an exemplary block diagram illustrating utilization of parent nodes and virtual parent nodes for data compression. To reduce polygons, the system identifies virtual parent mapping, such as the mapping shown on the uncompressed data map 1100.

In other examples, the system generates a tree like structure to depict all blocks, where all child geohash blocks are inclusion blocks. The system performs a bottom-up tree traversal. At each level of the tree, the system has a pre-defined number of expected numbers. If the number of actual children is equal to the expected number, then it seems all the children of this parent are within the required distance, hence we can remove all the children from the tree and only maintain/save the parent's information. Once the entire tree is traversed, the child nodes can be removed. Hence, the final inclusion list includes all the leaf nodes of the tree.

In the example shown in FIG. 11, the parent block 1102 has a count of 1 (one parent block) having a size of 150 m×150 m. The geohash identifier for this geohash parent block is "9ykvn96". The child block count is thirty-two indicating thirty-two child blocks associated with the parent block 1102. Each child block includes a unique identifier. For example, the child block 1104 is represented by the unique geohash identifier "9ykvn960". Child blocks having the same common properties are folded into a virtual parent. In this example, there is a virtual parent count of 8, indicating eight virtual parents representing sub-groups of one or more child blocks. For example, the virtual parent 1106 represented by the geohash identifier "9ykvn96!" represents a sub-group of four child blocks, including the child block 1104. In this manner, the amount of data saved is greatly reduced. Rather than save data for all the blocks shown in map 1100, the system only saves the compressed data shown in compressed data map 1108.

Figure 12:
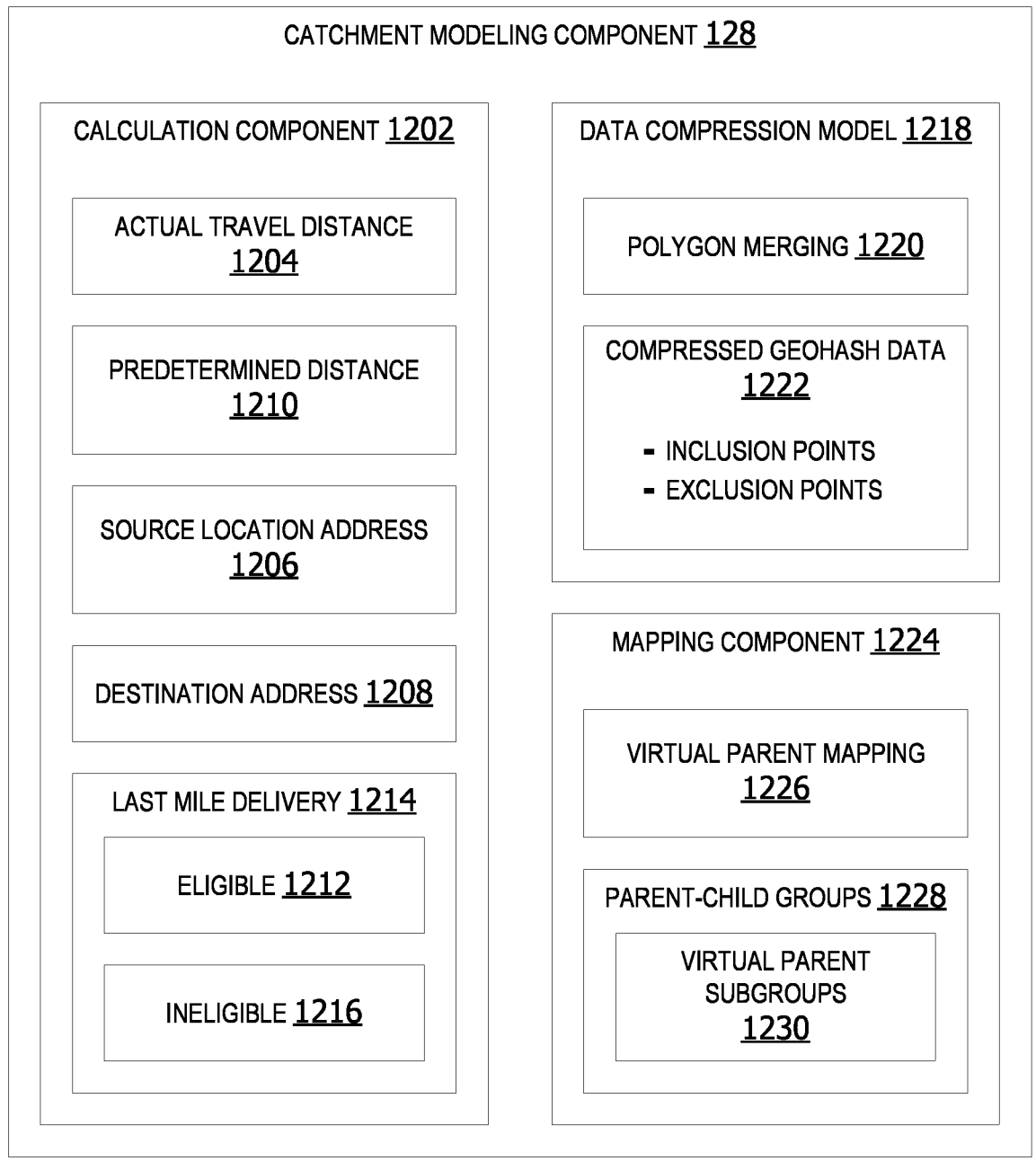
FIG. 12 is an exemplary block diagram illustrating a catchment modeling component.

FIG. 12 is an exemplary block diagram illustrating a catchment modeling component 128. In some examples, a calculation component 1202 calculates an actual travel distance 1204 from a source location address 1206 to a destination address 1208. The actual travel distance 1204 is the distance from the source to the destination as traveled by road, such as on streets traversed by a ground vehicle. If the actual travel distance 1204 is within a predetermined distance 1210. If the calculated actual travel distance 1204 is within the predetermined distance, the actual destination address 1208 is eligible 1212 for last mile delivery 1214 from the source location address. In other words, the destination address is within the inclusion set of blocks inside the catchment area associated with the source location address.

In other examples, a data compression model 1218 performs polygon merging 1220 on geohash blocks created by subdividing a catchment area into a plurality of blocks. In other words, overlapping polygons are merged together to form compressed geohash data. Intersecting polygons are merged to bigger polygons and assign a geohash.

The compressed geohash data 1222 includes inclusion points and/or exclusion points. The compressed geohash data is saved/cached for use in determining whether a customer address is eligible for delivery from a selected store/source. In some examples, the system caches inclusion geohash data identifying inclusion points within a catchment area for a source. In other examples, the system caches exclusion point related geohash data identifying exclusion points within the catchment area. In still other examples, the system caches compressed geohash data which includes the set of inclusion points and the set of exclusion points.

In still other examples, the system caches the set of travel point data which is shorter/contains the least amount of data to be cached. Thus, if the exclusion points list is shorter than the inclusion points list, the geohash data for the exclusion points is cached. Likewise, if the inclusion points list is shorter than the exclusion list/contains less data, the system caches the inclusion points list.

A mapping component 1224 optionally creates a virtual parent mapping 1226, such as, but not limited to, the map 1108 in FIG. 11. The mapping component 1224, in other examples, identifies virtual parent sub-groups 1230. A virtual parent sub-group is a group of blocks comprising one or more child blocks having one or more common properties represented by a virtual parent, such as, but not limited to, the virtual parent 1106 in FIG. 11. The one or more common properties includes a property indicating whether the child block is an inclusion block or an exclusion block.

Parent-child groups 1228 are optionally represented via the virtual parent mapping. The parent-child groups 1228 represent the child blocks associated with each parent block, such as the parent block 1102 shown FIG. 11 below. Parent-child groups 1228 can include one or more virtual parent sub-groups 1230. A virtual parent sub-group is a sub-grouping of child blocks in which two or more child blocks are represented by a virtual parent associated with an actual parent. In other words, an actual parent block having thirty-two child blocks can also include one or more virtual parent blocks within the group of child blocks. Each virtual parent block representing two or more child blocks having common properties, such as the virtual parent 1106 shown in FIG. 11 below.

Figure 13:
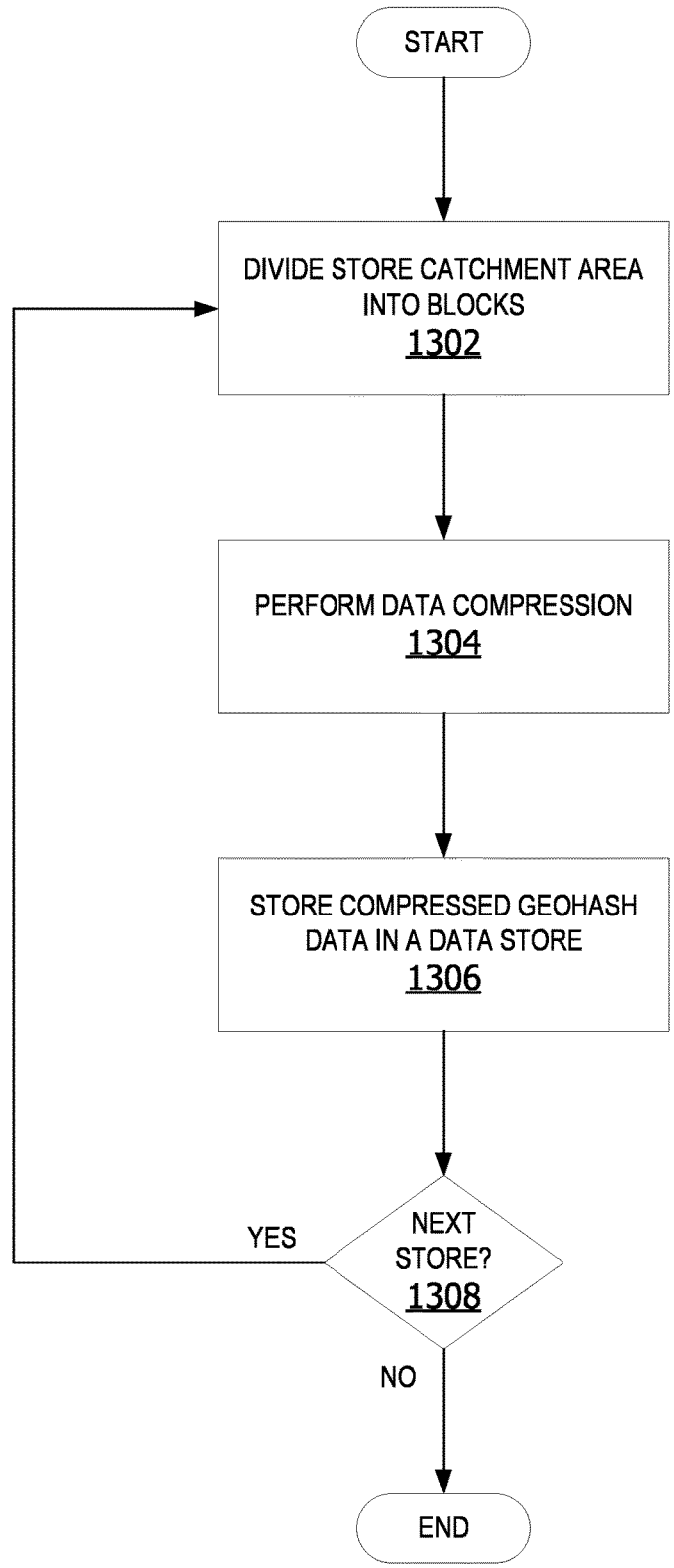
FIG. 13 is an exemplary flow chart illustrating operation of the computing device to identify catchment area inclusion points and data compression.

FIG. 13 is an exemplary flow chart illustrating operation of the computing device to identify catchment area inclusion points and data compression. The process shown in FIG. 13 is performed by a catchment modeling component, executing on a computing device, such as, but not limited to, the computing device 102.

The process begins by dividing the store catchment area into blocks at 1302. Data compression is performed at 1304. The compressed geohash data is stored in a data store at 1306. The data store can include a cache. A determination is made whether there is a next store to consider for catchment area determination at 1308. If yes, the process returns to 1302 and iteratively executes operations 1302 through 1308 until all possible stores for item delivery have been considered. The process terminates thereafter.

While the operations illustrated in FIG. 13 are performed by a computing device, aspects of the disclosure contemplate performance of the operations by other entities. In a non-limiting example, a cloud service performs one or more of the operations, such as, but not limited to, the cloud server 118 in FIG. 1. In another example, one or more computer-readable storage media storing computer-readable instructions may execute to cause at least one processor to implement the operations illustrated in FIG. 13.

Figure 14:
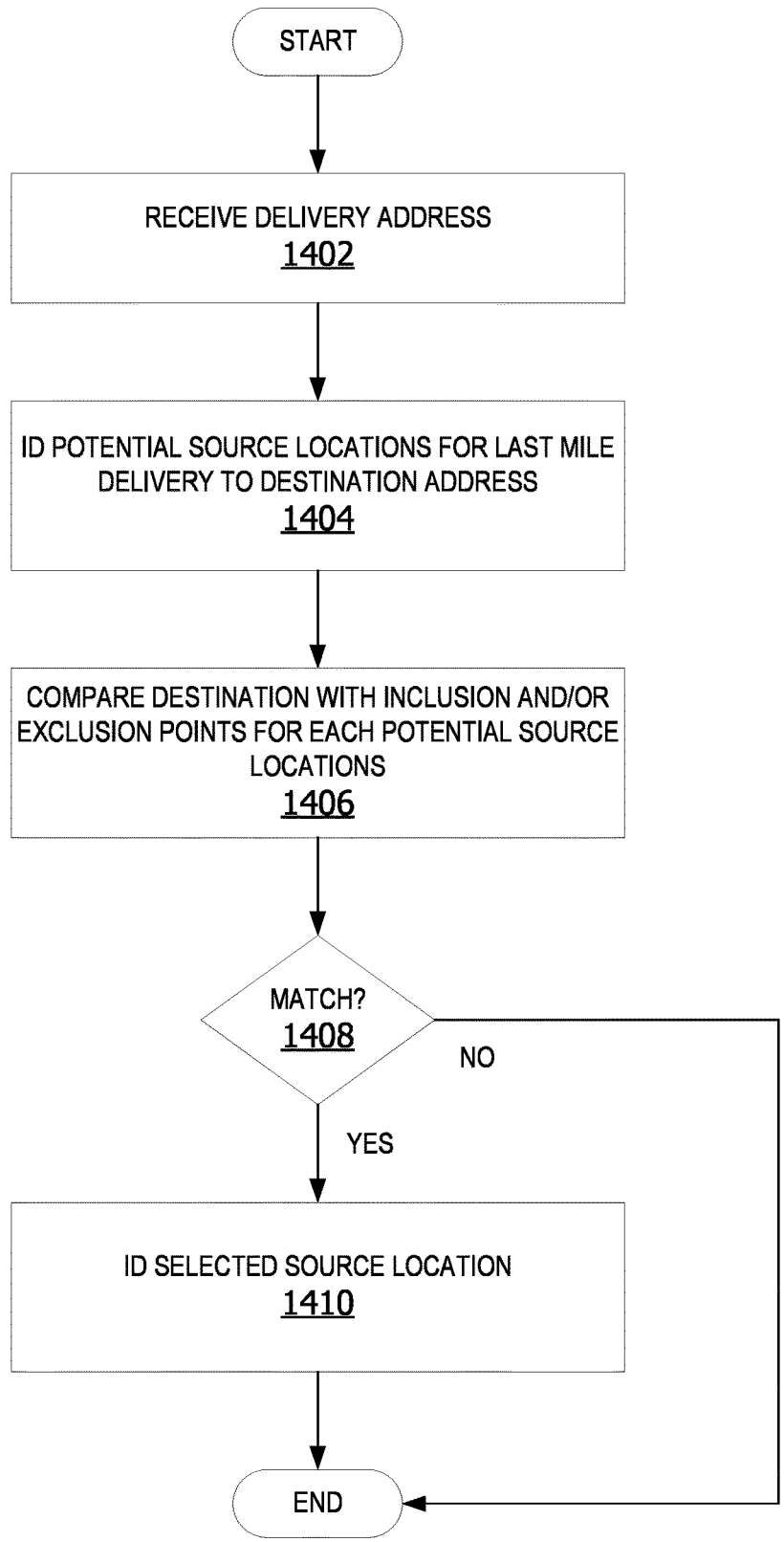
FIG. 14 is an exemplary flow chart illustrating operation of the computing device to select a source location for delivery of an item to a destination address.

FIG. 14 is an exemplary flow chart illustrating operation of the computing device to select a source location for delivery of an item to a destination address. The process shown in FIG. 14 is performed by a catchment modeling component, executing on a computing device, such as, but not limited to, the computing device 102.

The process begins by receiving a delivery address at 1402. Potential source locations are identified for last mile delivery to a destination address at 1404. The destination address is compared with inclusion points and/or exclusion points associated with each potential source location at 1406. The destination address is compared with a list of exclusion points where only the exclusion points are cached. The destination address is compared with inclusion points where only a list of inclusion points are cached. The destination address is compared with both inclusion points and exclusion points where a list of inclusion points and a list of exclusion points for a given catchment area have been cached and is otherwise available for utilization in determining whether the destination address is last mile delivery eligible for the selected source. A determination is made whether a match is found at 1408. If yes, a selected source location is identified at 1410. The process terminates thereafter.

While the operations illustrated in FIG. 14 are performed by a computing device, aspects of the disclosure contemplate performance of the operations by other entities. In a non-limiting example, a cloud service performs one or more of the operations, such as, but not limited to, the cloud server 118 in FIG. 1. In another example, one or more computer-readable storage media storing computer-readable instructions may execute to cause at least one processor to implement the operations illustrated in FIG. 14.

ADDITIONAL EXAMPLES

In some examples, the system includes a model to identify last mile delivery from a selected store which is in "X" miles travel distance for customers. The identification of the store is made within one millisecond. The system creates polygons around the store for "X" miles of travel distance. The polygon blocks are converted into a geohash and cached. When a customer orders an item, the system checks cached inclusion polygons/blocks to determine which stores are eligible for delivery.

The system, in other examples, identifies inclusion blocks and caches them so that catchment eligibility determinations can be made upfront without calculating the inclusion blocks for every online order.

A lookup service optionally is exposed to determine whether a customer is within the defined consumer catchment. In these examples, the lookup service takes the customer's 9-digit postal code, 5-digit postal code, or the customer's latitude and longitude as the destination. The service performs a lookup against the catchment data (generated during the catchment data generation phase) and returns a list of stores/sources which are within the pre-defined drivable distance. The catchment data is fixed, and catchment data generation is an offline process. The final lookup service utilises this data online or offline.

In still other examples, the system generates polygons for defined "X" miles of travel distance around the identified node (store/FC/DC), these polygons can be generated with very small size, to improve accuracy of the inclusion determination. The identified polygons centroid are verified whether they exists within the required travel distance "X" of the selected store and maintain their inclusion points in cache.

In other examples, the polygon fence is generated for the predetermined "X" mile travel distance around the source (store) node. Smaller polygons (geohash blocks) are created near the fence and on the fence to improve accuracy of store selection.

Alternatively, or in addition to the other examples described herein, examples include any combination of the following:
dividing a catchment area within a polygon fence surrounding a source location into a plurality of blocks, the polygon fence comprising a plurality of fence points located a predetermined distance from the source location;
the plurality of blocks comprising a set of inclusion points and a set of exclusion points, an inclusion point is a travel distance point having a travel distance from the source location less than or equal to the predetermined distance;

an exclusion point is a travel distance point having a travel distance from the source location greater than the predetermined distance;

performing data compression on geohash data representing the plurality of blocks via a polygon merging data compression model, the compressed geohash data representing the set of inclusion points and the set of exclusion points;

storing the compressed geohash data in a data storage device, wherein a delivery address corresponding to at least one inclusion point within the polygon fence is approved for last mile delivery from the source location;

identifying a destination address associated with delivery of at least one item from the source location within the catchment area on condition the destination address corresponds to an inclusion point;

identifying a plurality of source locations approved for last mile delivery to a destination address based on stored geohash data for plurality of source locations, wherein the location of the destination address is compared with stored inclusion travel points within catchment areas for the plurality of source locations to determine whether the source location is eligible for the last mile delivery to the destination address;

each block in the plurality of blocks is a sub-polygon within the polygon fence or overlapping the polygon fence;

generating a first set of blocks within the plurality of blocks having a first size;

generating a second set of blocks within the plurality of blocks having a second size;

wherein the first size is a larger size than the second size;

wherein the second set of blocks are located closer to a perimeter of the polygon fence, the second set of blocks have a smaller size and greater precision than the first set of blocks;

increasing precision of each block in the plurality of blocks as the points within the plurality of blocks approach at least one fence point in the plurality of fence points;

creating a plurality of virtual parent points, wherein each virtual parent point represents a set of child points within a sector grouping having common properties;

caching the virtual parent points, wherein the set of child points represented by each virtual parent point remain un-cached;

dividing the plurality of blocks into a set of subgroups, the set of subgroups comprising a set of parent blocks and a set of virtual parent blocks;

wherein a parent block in the set of parent blocks represent a set of thirty-two child blocks within a same sector having a set of common properties, and wherein a virtual parent block within the set of virtual parent blocks represents a sub-group of less than thirty-two child blocks within the same sector having the set of common properties;

identifying a destination address associated with delivery of at least one item from the source location within the catchment area and an actual travel distance between the source location and the destination address on condition the destination address corresponds to an inclusion point;

identifying a plurality of source locations approved for last mile delivery to a destination address based on stored geohash data for plurality of source locations, wherein the location of the destination address is compared with stored inclusion travel points within catchment areas for the plurality of source locations and an actual travel distance between the destination address and each source location in the plurality of source locations to determine whether the source location is eligible for the last mile delivery to the destination address; and outputting a list of filtered source locations excluding source locations having an actual travel distance from the source location to the destination address that is greater than the predetermined distance.

At least a portion of the functionality of the various elements in FIG. 1, FIG. 2, FIG. 3, FIG. 4, FIG. 5, FIG. 6, FIG. 7, FIG. 8, FIG. 9, FIG. 10, FIG. 11, and FIG. 12 can be performed by other elements in FIG. 1, FIG. 2, FIG. 3, FIG. 4, FIG. 5, FIG. 6, FIG. 7, FIG. 8, FIG. 9, FIG. 10, FIG. 11, and FIG. 12, or an entity (e.g., processor 106, web service, server, application program, computing device, etc.) not shown in FIG. 1, FIG. 2, FIG. 3, FIG. 4, FIG. 5, FIG. 6, FIG. 7, FIG. 8, FIG. 9, FIG. 10, FIG. 11, and FIG. 12.

In some examples, the operations illustrated in FIG. 13, FIG. 14 and FIG. 15 can be implemented as software instructions encoded on a computer-readable medium, in hardware programmed or designed to perform the operations, or both. For example, aspects of the disclosure can be implemented as a system on a chip or other circuitry including a plurality of interconnected, electrically conductive elements.

In other examples, a computer readable medium having instructions recorded thereon which when executed by a computer device cause the computer device to cooperate in performing a method of catchment modeling, the method comprising dividing a catchment area within a polygon fence surrounding a source location into a plurality of blocks; performing data compression on geohash data representing the plurality of blocks via a polygon merging data compression model; and storing the compressed geohash data in a data storage device, wherein a delivery address corresponding to at least one inclusion point within the polygon fence is approved for last mile delivery from the source location.

While the aspects of the disclosure have been described in terms of various examples with their associated operations, a person skilled in the art would appreciate that a combination of operations from any number of different examples is also within scope of the aspects of the disclosure.

The term "Wi-Fi" as used herein refers, in some examples, to a wireless local area network using high frequency radio signals for the transmission of data. The term "BLUETOOTH®" as used herein refers, in some examples, to a wireless technology standard for exchanging data over short distances using short wavelength radio transmission. The term "NFC" as used herein refers, in some examples, to a short-range high frequency wireless communication technology for the exchange of data over short distances.

Exemplary Operating Environment

Exemplary computer-readable media include flash memory drives, digital versatile discs (DVDs), compact discs (CDs), floppy disks, and tape cassettes. By way of example and not limitation, computer-readable media comprise computer storage media and communication media. Computer storage media include volatile and nonvolatile, removable, and non-removable media implemented in any method or technology for storage of information such as computer-readable instructions, data structures, program modules and the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, and other solid-state memory. In contrast, communication media typically embody computer-readable instructions, data structures, program modules, or the like, in a modulated data signal such as a carrier wave or other transport mechanism and include any information delivery media.

Although described in connection with an exemplary computing system environment, examples of the disclosure are capable of implementation with numerous other special purpose computing system environments, configurations, or devices.

Examples of well-known computing systems, environments, and/or configurations that can be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. Such systems or devices can accept input from the user in any way, including from input devices such as a keyboard or pointing device, via gesture input, proximity input (such as by hovering), and/or via voice input.

Examples of the disclosure can be described in the general context of computer-executable instructions, such as program modules, executed by one or more computers or other devices in software, firmware, hardware, or a combination thereof The computer-executable instructions can be organized into one or more computer-executable components or modules. Generally, program modules include, but are not limited to, routines, programs, objects, components, and data structures that perform tasks or implement abstract data types. Aspects of the disclosure can be implemented with any number and organization of such components or modules. For example, aspects of the disclosure are not limited to the specific computer-executable instructions or the specific components or modules illustrated in the figures and described herein. Other examples of the disclosure can include different computer-executable instructions or components having more functionality or less functionality than illustrated and described herein.

In examples involving a general-purpose computer, aspects of the disclosure transform the general-purpose computer into a special-purpose computing device when configured to execute the instructions described herein.

The examples illustrated and described herein as well as examples not specifically described herein but within the scope of aspects of the disclosure constitute exemplary means for catchment modeling. For example, the elements illustrated in FIG. 1, FIG. 2, FIG. 3, FIG. 4, FIG. 5, FIG. 6, FIG. 7, FIG. 8, FIG. 9, FIG. 10, FIG. 11 and FIG. 12, such as when encoded to perform the operations illustrated in FIG. 13, FIG. 14, and FIG. 15, constitute exemplary means for dividing a catchment area within a polygon fence surrounding a source location into a plurality of blocks; exemplary means for performing data compression on geohash data representing the plurality of blocks via a polygon merging data compression model; and exemplary means for storing the compressed geohash data in a data storage device, wherein a delivery address corresponding to at least one inclusion point within the polygon fence is approved for last mile delivery from the source location.

Other non-limiting examples provide one or more computer storage devices having a first computer-executable instructions stored thereon for providing catchment modeling. When executed by a computer, the computer performs operations including dividing a catchment area within a polygon fence surrounding a source location into a plurality of blocks; performing data compression on geohash data representing the plurality of blocks via a polygon merging data compression model, the compressed geohash data representing the set of inclusion points and the set of exclusion points; and storing the compressed geohash data in a data storage device, wherein a delivery address corresponding to at least one inclusion point within the polygon fence is approved for last mile delivery from the source location.

The order of execution or performance of the operations in examples of the disclosure illustrated and described herein is not essential, unless otherwise specified. That is, the operations can be performed in any order, unless otherwise specified, and examples of the disclosure can include additional or fewer operations than those disclosed herein. For example, it is contemplated that executing or performing an operation before, contemporaneously with, or after another operation is within the scope of aspects of the disclosure.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one of a number or list of elements, and, optionally, additional unlisted items. Only terms clearly indicated to the contrary, such as "only one of or "exactly one of," or, when used in the claims, "consisting of," will refer to the inclusion of exactly one element of a number or list of elements. In general, the term "or" as used shall only be interpreted as indicating exclusive alternatives (i.e., "one or the other but not both") when preceded by terms of exclusivity, such as "either" "one of" "only one of" or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system comprising:
   a processor; and
   a memory communicatively coupled to the processor and having stored thereon computer-executable instructions causing the processor to:
   divide a catchment area within a polygon fence surrounding a source location into a plurality of geohash blocks, the polygon fence comprising a plurality of fence points located a predetermined distance from the source location, the plurality of geohash blocks comprising a set of inclusion points, wherein an inclusion point is a travel distance point having a travel distance from the source location less than or equal to the predetermined distance;
   perform polygon merging data compression on geohash data representing the plurality of geohash blocks to form compressed geohash data, the geohash data representing the plurality of geohash blocks via a tree data structure having at least a parent geohash block and children geohash blocks common to the parent geohash block, the compressed geohash data representing the set of inclusion points, wherein performing polygon merging data compression on the geohash data includes removing the children geohash blocks common to the parent geohash block based on a determination that a number of the children geohash blocks common to the parent geohash block is greater than or equal to an expected number of children blocks; and
   store the compressed geohash data in a data storage device, wherein a delivery address corresponding to at least one inclusion point within the polygon fence is approved for last mile delivery from the source location.

2. The system of claim 1, wherein the computer-executable instructions further cause the processor to:
   identify a destination address associated with delivery of at least one item from the source location within the catchment area and an actual travel distance between the source location and the destination address on condition the destination address corresponds to an inclusion point.

3. The system of claim 1, wherein the computer-executable instructions further cause the processor to:
   identify a plurality of source locations approved for last mile delivery to a destination address based on stored geohash data for the plurality of source locations; and
   display, via a user interface device, the plurality of source locations as candidate source locations for last mile delivery to the destination address.

4. The system of claim 3, wherein the instructions to identify the plurality of source locations approved for last mile delivery to the destination address include instructions to:
   compare a location of the destination address with stored inclusion travel point(s) associated with a given source location to determine whether the given source location is eligible for last mile delivery to the destination address.

5. The system of claim 3, wherein the instructions to identify the plurality of source locations approved for last mile delivery to the destination address further include instructions to:
   compare an actual travel distance between the destination address and a given source location with a predetermined distance to determine whether the given source location is eligible for last mile delivery to the destination address.

6. The system of claim 5, wherein the instructions to display, via the user interface device, the plurality of source locations as candidates for last mile delivery to the destination address include instructions to:
   exclude the given source location from the plurality of source locations displayed as candidates for last mile delivery to the destination address responsive to determining that the actual travel distance from the given source location to the destination address is greater than the predetermined distance.

7. A method comprising:
   dividing a catchment area within a polygon fence surrounding a source location into a plurality of geohash blocks, the polygon fence comprising a plurality of fence points located a predetermined distance from the source location, the plurality of geohash blocks comprising a set of inclusion points, wherein an inclusion point is a travel distance point having a travel distance from the source location less than or equal to the predetermined distance;

performing polygon merging data compression on geohash data representing the plurality of geohash blocks to form compressed geohash data, the geohash data representing the plurality of geohash blocks via a tree data structure having at least a parent geohash block and children geohash blocks common to the parent geohash block, the compressed geohash data representing the set of inclusion points, wherein performing polygon merging data compression on the geohash data includes removing the children geohash blocks common to the parent geohash block based on a determination that a number of the children geohash blocks common to the parent geohash block is greater than or equal to an expected number of children blocks; and storing the compressed geohash data in a data storage device, wherein a delivery address corresponding to at least one inclusion point within the polygon fence is approved for last mile delivery from the source location.

8. The method of claim 7, further comprising:
identifying a destination address associated with delivery of at least one item from the source location within the catchment area and an actual travel distance between the source location and the destination address on condition the destination address corresponds to an inclusion point.

9. The method of claim 7, further comprising:
identifying a plurality of source locations approved for last mile delivery to a destination address based on stored geohash data for the plurality of source locations; and
displaying, via a user interface device, the plurality of source locations as candidate source locations for last mile delivery to the destination address.

10. The method of claim 9, wherein identifying the plurality of source locations approved for last mile delivery to the destination address comprises:
comparing a location of the destination address with stored inclusion travel point(s) associated with a given source location to determine whether the given source location is eligible for last mile delivery to the destination address.

11. The method of claim 9, wherein identifying the plurality of source locations approved for last mile delivery to the destination address comprises:
comparing an actual travel distance between the destination address and a given source location with a predetermined distance to determine whether the given source location is eligible for last mile delivery to the destination address.

12. The method of claim 11, wherein displaying, via the user interface device, the plurality of source locations as candidates for last mile delivery to the destination address comprises:
excluding the given source location from the plurality of source locations displayed as candidates for last mile delivery to the destination address responsive to determining that the actual travel distance from the given source location to the destination address is greater than the predetermined distance.

13. One or more computer storage devices having computer-executable instructions stored thereon, which, on execution by a computer, cause the computer to perform operations comprising:
dividing a catchment area within a polygon fence surrounding a source location into a plurality of geohash blocks, the polygon fence comprising a plurality of fence points located a predetermined distance from the source location, the plurality of geohash blocks comprising a set of inclusion points, wherein an inclusion point is a travel distance point having a travel distance from the source location less than or equal to the predetermined distance;

performing polygon merging data compression on geohash data representing the plurality of geohash blocks to form compressed geohash data, the geohash data representing the plurality of geohash blocks via a tree data structure having at least a parent geohash block and children geohash blocks common to the parent geohash block, the compressed geohash data representing the set of inclusion points, wherein performing polygon merging data compression on the geohash data includes removing the children geohash blocks common to the parent geohash block based on a determination that a number of the children geohash blocks common to the parent geohash block is greater than or equal to an expected number of children blocks; and storing the compressed geohash data in a data storage device, wherein a delivery address corresponding to at least one inclusion point within the polygon fence is approved for last mile delivery from the source location.

14. The one or more computer storage devices of claim 13, wherein the operations further comprise:
identifying a destination address associated with delivery of at least one item from the source location within the catchment area and an actual travel distance between the source location and the destination address on condition the destination address corresponds to an inclusion point.

15. The one or more computer storage devices of claim 13, wherein the operations further comprise:
identifying a plurality of source locations approved for last mile delivery to a destination address based on stored geohash data for the plurality of source locations; and
displaying, via a user interface device, the plurality of source locations as candidate source locations for last mile delivery to the destination address.

16. The one or more computer storage devices of claim 15, wherein identifying the plurality of source locations approved for last mile delivery to the destination address comprises:
comparing a location of the destination address with stored inclusion travel point(s) associated with a given source location to determine whether the given source location is eligible for last mile delivery to the destination address.

17. The one or more computer storage devices of claim 15, wherein identifying the plurality of source locations approved for last mile delivery to the destination address comprises:
comparing an actual travel distance between the destination address and a given source location with a predetermined distance to determine whether the given source location is eligible for last mile delivery to the destination address.

18. The one or more computer storage devices of claim 17, wherein displaying, via the user interface device, the plurality of source locations as candidates for last mile delivery to the destination address comprises:
excluding the given source location from the plurality of source locations displayed as candidates for last mile delivery to the destination address responsive to determining that the actual travel distance from the given source location to the destination address is greater than the predetermined distance.

\* \* \* \* \*